US012314687B2

(12) United States Patent
Ewing, Jr. et al.

(10) Patent No.: US 12,314,687 B2
(45) Date of Patent: May 27, 2025

(54) DIGITAL ENGINEERING ECOSYSTEM

(71) Applicant: Science Applications International Corporation, Reston, VA (US)

(72) Inventors: David L. Ewing, Jr., Kingsport, TN (US); Andrew R. Fischer, Chantilly, VA (US); Landon A. Michel, Rogersville, TN (US)

(73) Assignee: Science Applications International Corporation, Reston, VA (US)

( * ) Notice: Subject to any disclaimer, the term of this patent is extended or adjusted under 35 U.S.C. 154(b) by 107 days.

(21) Appl. No.: 18/130,575

(22) Filed: Apr. 4, 2023

(65) Prior Publication Data

US 2024/0143286 A1 May 2, 2024

Related U.S. Application Data

(60) Provisional application No. 63/419,919, filed on Oct. 27, 2022.

(51) Int. Cl.
*G06F 8/20* (2018.01)
*G06F 8/36* (2018.01)

(52) U.S. Cl.
CPC . *G06F 8/20* (2013.01); *G06F 8/36* (2013.01)

(58) Field of Classification Search
CPC ..................................... G06F 8/20; G06F 8/36
USPC .................................................. 717/101–121
See application file for complete search history.

(56) References Cited

U.S. PATENT DOCUMENTS

| | | | | |
|---|---|---|---|---|
| 6,282,699 B1* | 8/2001 | Zhang | ...................... | G06F 8/34 717/109 |
| 6,847,384 B1* | 1/2005 | Sabadell | ............... | G06F 16/258 703/2 |
| 6,874,146 B1* | 3/2005 | Iyengar | ................. | G06F 40/143 715/236 |
| 7,801,699 B1* | 9/2010 | Roucis | .................. | G06F 30/367 702/182 |
| 8,285,660 B2* | 10/2012 | Coldicott | ................ | G06F 16/21 706/45 |
| 8,762,939 B1* | 6/2014 | Ulug | ........................ | G06F 9/44 717/109 |
| 9,250,900 B1* | 2/2016 | Kim | ........................ | G06F 15/76 |
| 10,181,059 B1* | 1/2019 | Brewton | ................... | G06F 8/20 |
| 10,255,303 B1 | 4/2019 | Britton et al. | | |
| 10,867,091 B1* | 12/2020 | Oh | ........................ | G06F 30/331 |
| 11,252,010 B2* | 2/2022 | Schmid | ................. | H04L 63/102 |

(Continued)

OTHER PUBLICATIONS

Harrison et al, "Engineering Methods and Tools for Cyber-Physical Automation Systems", IEEE, pp. 973-985 (Year: 2016).*

(Continued)

*Primary Examiner* — Anil Khatri
(74) *Attorney, Agent, or Firm* — Banner & Witcoff, Ltd.

(57) ABSTRACT

A digital engineering ecosystem may comprise a plurality of digital engineering software tools, a plurality of connectors corresponding to the digital engineering software tools, and project data integration software that may execute on, and be hosted by, a computing system. Users may access the digital engineering software tools to generate design data for a project. The project data integration software may generate and store project data that may be used to track links between design data generated by the software tools.

20 Claims, 11 Drawing Sheets

(56) References Cited

U.S. PATENT DOCUMENTS

| | | | | |
|---|---|---|---|---|
| 11,269,660 B2* | 3/2022 | Yueh | ................ | G06F 9/44526 |
| 11,526,335 B2* | 12/2022 | Nguyen | ................ | G06F 9/4881 |
| 11,775,707 B1* | 10/2023 | Roper, Jr. | ................ | G06F 30/12 |
| | | | | 703/1 |
| 11,886,837 B2* | 1/2024 | Podder | ................ | G06F 8/20 |
| 12,189,378 B2* | 1/2025 | Stump | ................ | G05B 19/4185 |
| 2023/0132531 A1* | 5/2023 | Chandler | ................ | G06F 8/61 |
| | | | | 717/101 |

OTHER PUBLICATIONS

Cheng et al, "Automated Feature Generation from Structured Knowledge", ACM, pp. 1395-1404 (Year: 2011).*

Beaumont et al, "Towards Re-Engineering Digital Twins", ACM, pp. 1-6 (Year: 2024).*

Gudder et al, "Integrated Engineering Data Transformation: An AutomationML-based approach for efficient data exchange", IEEE, pp. 1-4 (Year: 2024).*

Lakha et al, "Analysis of Software Engineering Practices in General Software and Machine Learning Startups", IEEE, pp. 1-8 (Year: 2023).*

Kim et al, "Case Study on Model Driven Data Integration for Data Centric Software Development", ACM, pp. 1-5 (Year: 2009).*

* cited by examiner

DIGITAL ENGINEERING ECOSYSTEM

CROSS-REFERENCE TO RELATED APPLICATIONS

This application claims priority to Provisional U.S. Patent Application No. 63/419,919, filed Oct. 27, 2022, and titled "Digital Engineering Ecosystem," the entire contents of which are incorporated by reference herein.

BACKGROUND

Engineering projects to develop complex systems may proceed through different project phases. A variety of different software tools may be used to generate design data for those different project phases. However, integrating design data from different tools presents challenges.

SUMMARY

This Summary is provided to introduce a selection of some concepts in a simplified form as a prelude to the Detailed Description. This Summary is not intended to identify key or essential features.

Systems, methods, apparatuses, and non-transitory machine-readable media are described herein for a digital engineering (DE) ecosystem. The DE ecosystem may comprise a plurality of DE software tools, a plurality of connectors corresponding to the DE software tools, and project data integration (PDI) software. The DE software tools, the connectors, and the PDI software may execute on, and be hosted by, a computing system. Computing devices may access the DE ecosystem via a network. Input to DE software tools may be used by the software tools to generate design data. Design data from the software tools may be used to generate, using connectors corresponding to those tools, input data to the PDI software. Based on that input data, the PDI software may generate and store project data. The project data may be used to track links between design data generated by the software tools.

These and other features are described in more detail below.

BRIEF DESCRIPTION OF THE DRAWINGS

Some features are shown by way of example, and not by way of limitation, in the figures of the accompanying drawings and in which like reference numerals refer to similar elements.

DETAILED DESCRIPTION

Figure 1:
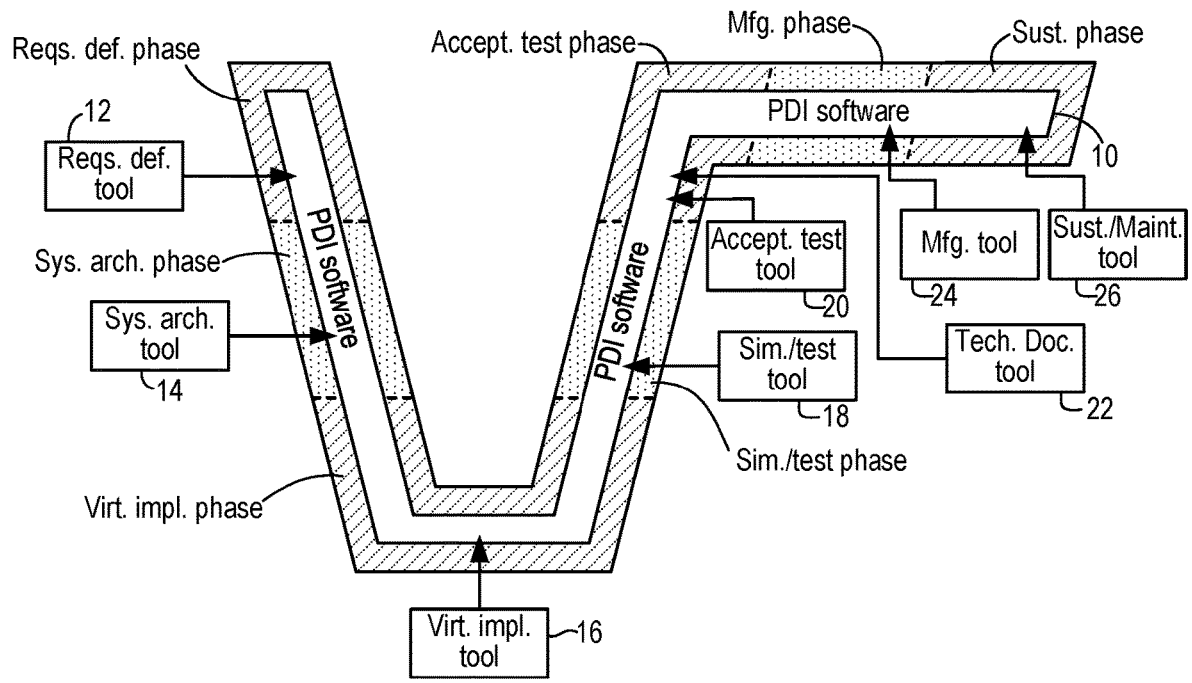
FIG. 1 is diagram showing, for an example digital engineering ecosystem, interactions of software and relationships of software to engineering project phases.

Developing new products or services often requires development of a complex system of interrelated subsystems and components. For example, a new vehicle (e.g., an aircraft, a ship, a land vehicle) may be treated as a system having one or more subsystems associated with the vehicle structure (e.g., an airframe, a chassis/body, a hull, etc.), one or more subsystems associated with propulsion (e.g., engines, mechanical power transfer, fuel storage and supply, etc.), one or more subsystems associated with electrical power generation (e.g., generators and/or alternators, batteries, etc.), one or more subsystems associated with control electronics, one or more subsystems associated with navigation, and/or numerous other types of subsystems. Subsystems may have further subsystems in one or more hierarchical layers (e.g., subsystems of subsystems, subsystems of subsystems of subsystems, etc.) and/or components (e.g., physical parts). Each of the subsystems and/or components may have multiple relationships with other subsystems and components. Numerous other types of products (e.g., consumer electronic devices, consumer appliances, telecommunication and networking equipment, industrial equipment, etc.) and installations (industrial plants and facilities, etc.) may similarly comprise complex systems of interrelated subsystems and/or components. Services may also comprise complex systems of interrelated subsystems and/or components. For example, a delivery service may comprise subsystems for route planning, for vehicle maintenance, for prepositioning of vehicles or other equipment, for warehousing, for personnel management and scheduling, etc.

Engineering projects to develop and implement these and other types of systems may progress through several phases that may begin with a concept and that may proceed to a solution. In a requirements definition phase, engineers and other developers may define requirements that a system should satisfy. Requirements may comprise functional requirements for the system and/or for subsystems and/or components. As but a few examples, functional requirements may define a speed at which a something will move, an environment in which something must be able to operate, acceptable levels of various types of undesirable outputs (e.g., noise, heat, exhaust, waste products, vibration, radiation, etc.), minimum levels of various types of desirable outputs (e.g., flow from a pump, mechanical power from an engine, electrical power from an electrical power source, heat from a heater, cooling from a cooling device, chemical product from a mixer or reactor, manufactured products from a product line, etc.), a load (e.g., a weight or mass) that a system must support or carry, etc. Numerous other types of requirements may be defined for a system and/or for subsystems and/or components. As but a few additional examples, requirements may comprise safety requirements (e.g., how a system should operate to protect personnel), durability requirements (e.g., how long something should last and/or how many uses something must provide), usability requirements (e.g., how difficult it may be to operate and/or to train people to operate something), cost requirements, source requirements (e.g., wherein materials may be obtained, where something may be built), environmental/ecological requirements (e.g., how much pollution a system may generate, disposability of components at the end of their lifecycle), and/or other types of requirements.

A system architecture phase may follow the requirements definition phase, although the requirements definition phase and the system architecture phase may overlap. In the system architecture phase, engineers and other developers may define subsystems of a system, components of subsystems, how subsystems and/or components relate to other subsystems and/or components, how subsystems and/or components may be used (e.g., by human users and/or by other subsystems or components), inputs to subsystems and/or components, outputs from subsystems or components, alternatives for subsystems and/or components, process flows, and/or numerous other details of the system architecture. Subsystems and/or components defined during the system architecture phase may or not be explicitly addressed or identified in the requirements definition. In many cases, however, mapping of subsystems and/or components to requirements of a requirements definition is not one-to-one. For example, whether a given requirement is satisfied may depend on multiple subsystems and/or components. Indeed, determining and tracking how requirements will be satisfied (e.g., by which subsystems and/or components) is often a difficult and complex part of the system architecture phase. System architecture phase activities may drive additional requirements definition phase activities. For example, one or more aspects of the system architecture developed during the system architecture phase may reveal additional requirements to be defined and/or problems with previously-defined requirements.

A virtual implementation phase may follow the system architecture phase, although the virtual implementation phase may overlap with the system architecture phase and/or the requirements definition phase. In the virtual implementation phase, virtual models (e.g., computer-aided design (CAD) models of physical structures) may be developed for components and subsystems, and perhaps for the system as a whole. Examples of activities during the virtual implementation phase may comprise creating detailed virtual models of components (e.g., virtual models specifying physical dimensions, materials, etc.) and/or of subsystems (e.g., virtual assemblies of component models and/or virtual assemblies of models of other subsystems) that may have been included in the system architecture, but for which the system architecture did not specify structure, as well as creating virtual models of components not specifically addressed by the system architecture. Activities during the virtual implementation phase may drive additional activities in the system architecture phase or in the requirements definition phase. For example, design details developed during the virtual implementation phase may reveal system architecture details that may need to be refined or further developed, and/or may indicate additional requirements to be defined and/or problems with previously-defined requirements.

A simulation/test phase may follow the virtual implementation phase, although the simulation/test phase may overlap with the virtual implementation phase, the system architecture phase, and/or the requirements definition phase. In the simulation/test phase, simulations and/or tests may be performed. In simulations, computational processes that model the effects of physical phenomena (e.g., force, heat, cold, pressure, stress, electrical current and/or voltage, etc.) may be used to evaluate physical components and/or subsystems modelled by the one or more detailed virtual models. In tests, actual physical elements (e.g., material samples, prototype components and/or subsystems) may be evaluated by physical tests. Evaluations from simulations and/or tests may be used to determine if at least some of the requirements from the requirements definition have been satisfied. Activities during the simulation/test phase may drive additional activities in the virtual implementation phase, in the system architecture phase, and/or in the requirements definition phase. For example, results of simulations and/or tests during the simulation/test phase may reveal problems that necessitate changing design details developed during the virtual design phase. Modifying those design details may have impact on, and require further revision and/or or consideration of, the system architecture or the requirements.

An acceptance testing phase may follow the simulation/test phase. In the acceptance testing phase, the system as whole may be evaluated. This may comprise determining if all requirements of the requirements definition have been satisfied. Activities during the acceptance testing phase may drive additional activities in previous phases. For example, acceptance testing may reveal that one or more requirements have not been satisfied. This may result in modification of the system architecture and/or of the detailed virtual design, which modifications may necessitate further simulation and/or testing.

A manufacturing phase may follow the acceptance testing phase. In the manufacturing phase, processes may be developed for manufacturing the system, subsystems, and/or components. For example, detailed virtual designs may be used to create instructions for computer-controlled machine tools used to fabricate physical parts. Activities during the manufacturing phase may drive additional activities in previous phases. For example, problems discovered when determining how to manufacture a part of subsystem may result in modification of the system architecture and/or of the detailed virtual design, which modifications may necessitate further simulation and/or testing.

A sustainment/maintenance phase may follow, and/or may at least partially coincide with, the manufacturing phase. During the sustainment/maintenance phase, performance of the actual system may be reviewed and/or evaluated. This may drive additional activities in previous phases. For example, problems discovered in a real-world implementation of the system may result in modification of the system architecture and/or of the detailed virtual design, which modifications may necessitate further simulation and/or testing and/or further modification to manufacturing processes.

An engineering project may also comprise development of technical documentation for a system being designed. Technical documentation may comprise user manuals, operation manuals, repair manuals, compilations of engineering performance data, documentation for interfacing and/or interworking a system with other systems, parts catalogs, and/or numerous other types of technical data. Technical documentation may be generated, revised, and/or update throughout a lifecycle of a system and during any of the above-mentioned phases.

For at least some of the above-described engineering project phases, there are existing software tools that may be used to perform activities associated with a particular phase. However, integrating data from those tools remains a challenge. As explained above, activities in a later engineering project phase may require re-assessment of data from a preceding engineering project phase. The ability to reliably trace relationships between engineering data of various phases enhances the efficiency of the overall design process and may lead to better designs. For various reasons, however, such integration remains a challenge.

There are a variety of engineering software tools that are able to perform activities associated with a single one of the above-described engineering project phases. But there are fewer tools able to perform activities related to multiple phases, and in particular, able to perform activities associated with the requirements definition phase, the system architecture phase, the virtual implementation phase, the simulation/test phase, the acceptance testing phase, the manufacturing phase, and the sustainment/maintenance phase. However, engineering software tools able to perform activities for multiple phases may lack desired features in connection with one or more phases. Moreover, users may simply have preferences for particular software tools, from different software providers, for use with different phases. If different engineering software tools are used for different phases, integrating data from those tools may be more difficult, particularly if those tools are from different software providers.

There are additional challenges associated with providing an organization with engineering software tools to perform activities for multiple engineering project phases. For an organization of any size, setting up such tools may require acquisition of new user workstations and/or servers and configuration of those work stations and/or servers. Moreover, an organization that will use different tools for different engineering project phases must separately license all of those tools, which licensing may require an advance determination of how many users are expected to use various tools.

Described herein are digital engineering (DE) ecosystems that address some or all of the above challenges. A DE ecosystem may be provided as a unified service to an enterprise such as a corporation or other group that is performing an engineering design project. The DE ecosystem may comprise project data integration (PDI) software and a plurality of engineering software tools, and may be hosted in the cloud. The DE ecosystem may further comprise a plurality of connectors, with each of the connectors corresponding to a different one of the engineering software tools and configured for generation of input data for the PDI software based on output data from its corresponding software tool. Based on such input data, the PDI software may generate project data that corresponds to at least a portion of the output data from the software tool, and that may be mapped or otherwise linked to other project data corresponding to output data from other software tools. Users associated with an enterprise may access the DE ecosystem via web browsers on conventional computing devices. At each stage of an engineering project, users may be able to access project data, created by the PDI software, that may map and/or otherwise link data elements generated by the software tools. This may allow users working in later project phases to make design decisions based on reliable data from earlier phases. Moreover, providing the DE ecosystem to the enterprise as a service facilitates simpler licensing of software.

FIG. 1 is diagram showing, for an example DE ecosystem, interactions of software and relationships of such software to engineering project phases. The project phases are shown on a V diagram similar to other system engineering V diagrams. Overlaid on the V is PDI software 10. The PDI software 10 may comprise a single application, or may comprise a combination of applications (e.g., a commercially available application suite or other combination of interrelated applications). The PDI software 10, which may comprise product lifecycle management (PLM) software and/or digital thread (DT) software, may integrate design data that is generated during each of the phases and make that integrated data available to determine links between design data elements corresponding to each of the phases. An example of software that may be used for the PDI software is the Aras Innovator® software provided by Aras Corporation of Andover, MA, US.

Requirements definition (reqs. def.) tool 12 may comprise a software tool that may interface (via a connector, not shown) with the PDI software 10. The software of the requirements definition tool 12 may comprise a single application, or may comprise a combination of applications (e.g., a commercially available application suite or other combination of interrelated applications). The requirements definition tool 12 may be used to define requirements for an engineering project and may output design data that comprises data elements describing those requirements. The requirements definition tool 12 may be software that is not an extension of, and is not native to, the PDI software 10, and/or that is not provided by the provider of the PDI software 10. An example of software that may be used for the requirements definition tool 12 is the IBM® Engineering Requirements Management DOORS® Next software provided by International Business Machines Corporation of Armonk, NY, US.

System architecture (sys. arch.) tool 14 may comprise a software tool that may interface (via a connector, not shown) with the PDI software 10. The software of the system architecture tool 14 may comprise a single application, or may comprise a combination of applications (e.g., a commercially available application suite or other combination of interrelated applications). The system architecture tool 14 may be used to define a system architecture for an engineering project and may output design data that comprises data elements describing that system architecture. The system architecture tool 14 may be software that is not an extension of, and is not native to, the PDI software 10, and/or that is not provided by the provider of the PDI software 10. Examples of software that may be used for the system architecture tool 14 are the CAMEO ENTERPRISE ARCHITECTURE software provided by Dassault Systemes of Volizy-Villacoublay, FR and/or the IBM® Rational® Rhapsody® software provided by International Business Machines Corporation.

Virtual implementation (virt. impl.) tool 16 may comprise software that may interface (via a connector, not shown) with the PDI software 10. The software of the virtual implementation tool 16 may comprise a single application, or may comprise a combination of applications (e.g., a commercially available application suite or other combination of interrelated applications). The virtual implementation tool 16 may be used to create detailed virtual models of components and/or subsystems, and/or of an entire system. The virtual implementation tool 16 may output design data that comprises data elements describing those detailed virtual models. The virtual implementation tool 16 may be software that is not an extension of, and is not native to, the PDI software 10, and/or that is not provided by the provider of the PDI software 10. Example software that may be used for the virtual implementation tool 16 are the Solidworks® software provided by Dassault Systemes SolidWorks Corporation of Waltham, MA, US and/or the NX software provided by Siemens Industry Software Inc. of Plano, TX, US.

Simulation/test (sim./test) tool 18 may comprise software that may interface (via a connector, not shown) with the PDI software 10. The software of the simulation/test tool 18 may comprise a single application, or may comprise a combination of applications (e.g., a commercially available application suite or other combination of interrelated applications). The simulation/test tool 18 may be used to simulate use of, and/or the effects of physical phenomena on, physical elements that are represented by virtual models of components and/or subsystems, and/or of an entire system. The simulation/test tool 18 may also or alternatively be used to conduct and/or document tests on physical elements. The simulation/test tool 18 may output design data that comprises data elements describing results of simulations and/or other virtual tests of modelled components, sub-systems or an entire system, as well as data elements describing actual tests. The simulation/test tool 18 may be software that is not an extension of, and is not native to, the PDI software 10, and/or that is not provided by the provider of the PDI software 10. Example software that may be used for the simulation/test tool 18 are the MATLAB® software provided by The MathWorks, Inc. of Natick, MA, US, the AGI STK software provided by Ansys, Inc. of Canonsburg, PA, US, the AGI Systems Tool Kit software provided by Ansys, Inc., the AFSIM (Advanced Framework for Simulation, Integration and Modeling) software provided by the United States government (the United States Air Force Research Laboratory), and/or the ModelCenter® software and the ModelCenter® MBSE software provided by Ansys, Inc.

Acceptance testing (Accept. test) tool 20 may comprise a software tool that may interface (via a connector, not shown) with the PDI software 10. The software of the acceptance testing tool 20 may comprise a single application, or may comprise a combination of applications (e.g., a commercially available application suite or other combination of interrelated applications). The acceptance testing tool 20 may be used to generate documentation for acceptance testing and/or to track acceptance testing data, and may output design data that comprises data elements associated with acceptance testing. The acceptance testing tool 20 may be software that is not an extension of, and is not native to, the PDI software 10, and/or that is not provided by the provider of the PDI software 10.

Technical documentation (Tech. doc.) tool 22 may comprise a software tool that may interface (via a connector, not shown) with the PDI software 10. The software of the technical documentation tool 22 may comprise a single application, or may comprise a combination of applications (e.g., a commercially available application suite or other combination of interrelated applications). The technical documentation tool 22 may be used to generate manuals and/or other documentation to describe operation of, repair or, use of, and/or other characteristics of a system (or component thereof) that is designed using tools of the digital engineering ecosystem of FIG. 1, and may output design data that comprises data elements associated with such manuals and/or other technical documentation. The technical documentation tool 22 may be software that is not an extension of, and is not native to, the PDI software 10, and/or that is not provided by the provider of the PDI software 10.

Manufacturing tool (Mfg.) tool 24 may comprise a software tool that may interface (via a connector, not shown) with the PDI software 10. The software of the manufacturing tool 24 may comprise a single application, or may comprise a combination of applications (e.g., a commercially available application suite or other combination of interrelated applications). The manufacturing tool 24 may be used to generate and/or track data associated with manufacturing a system (or component thereof) that is designed using tools of the digital engineering ecosystem of FIG. 1, and may output design data that comprises data elements associated with such manufacturing. The manufacturing tool 24 may be software that is not an extension of, and is not native to, the PDI software 10, and/or that is not provided by the provider of the PDI software 10.

Sustainment/Maintenance tool (Sust./Maint.) tool 26 may comprise a software tool that may interface (via a connector, not shown) with the PDI software 10. The software of the sustainment/maintenance tool 26 may comprise a single application, or may comprise a combination of applications (e.g., a commercially available application suite or other combination of interrelated applications). The sustainment/maintenance tool 26 may be used to generate and/or track data associated with engineering changes and/or other modifications to a system (or component thereof) that is designed using tools of the digital engineering ecosystem of FIG. 1, and may output design data that comprises data elements associated with such changes and/or modifications. The sustainment/maintenance tool 26 may be software that is not an extension of, and is not native to, the PDI software 10, and/or that is not provided by the provider of the PDI software 10.

Figure 2:
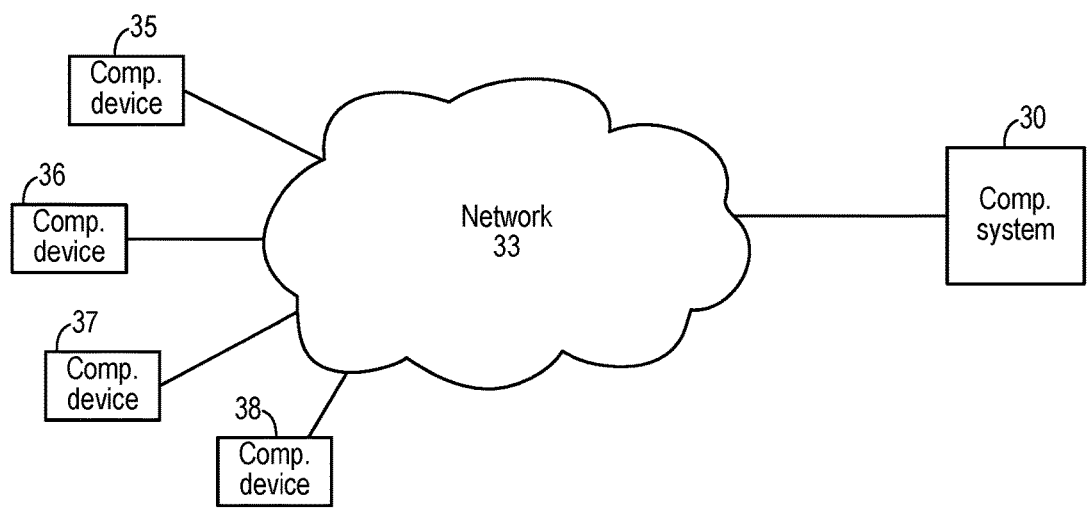
FIG. 2 is a diagram showing an example network in which a digital engineering ecosystem may be implemented.

FIG. 2 is a diagram showing an example network in which an example DE ecosystem may be implemented. Software of a DE ecosystem may be hosted on, and be executed by, a computing system 30. As described in more detail in connection with FIG. 3, such software may comprise the PDI software 10, the tools 12, 14, 16, 18, 20, 22, 24, and 26, corresponding connectors, and additional software components. Although shown as a single block in FIG. 2 for convenience, the computing system 30 may comprise a single computing device or may comprise multiple computing devices. If implemented as multiple computing devices, the computing devices of the computing system 30 may communicate via one or more local or wide area networks (e.g., the network 33 described below), and may or may not be in close proximity of one another. Multiple computing devices of the computing system 30 may distribute computational tasks associated with the DE ecosystem software in any manner, and/or may host some or all of that software in one or more virtual servers. The computing system 30 may, for example, comprise computing devices associated with a cloud computing platform such as Amazon Web Services® cloud computing hosting services.

The computing system 30 may communicate, via one or more networks 33, with one or more computing devices such as the computing devices 35 through 38. Each of the computing devices 35 through 38, and/or other computing devices not shown in FIG. 2, may be associated with a user and may be used to access DE ecosystem software hosted on the computing system 30. Each of the computing devices 35 through 38, and/or other computing devices, may comprise a laptop computer, a desktop computer, and/or other type of computer comprising web browser software that may be used to access the DE ecosystem software. The network 33 may comprise the Internet and/or other wide area data network, a local area data network, or a combination of data networks.

Figure 3:
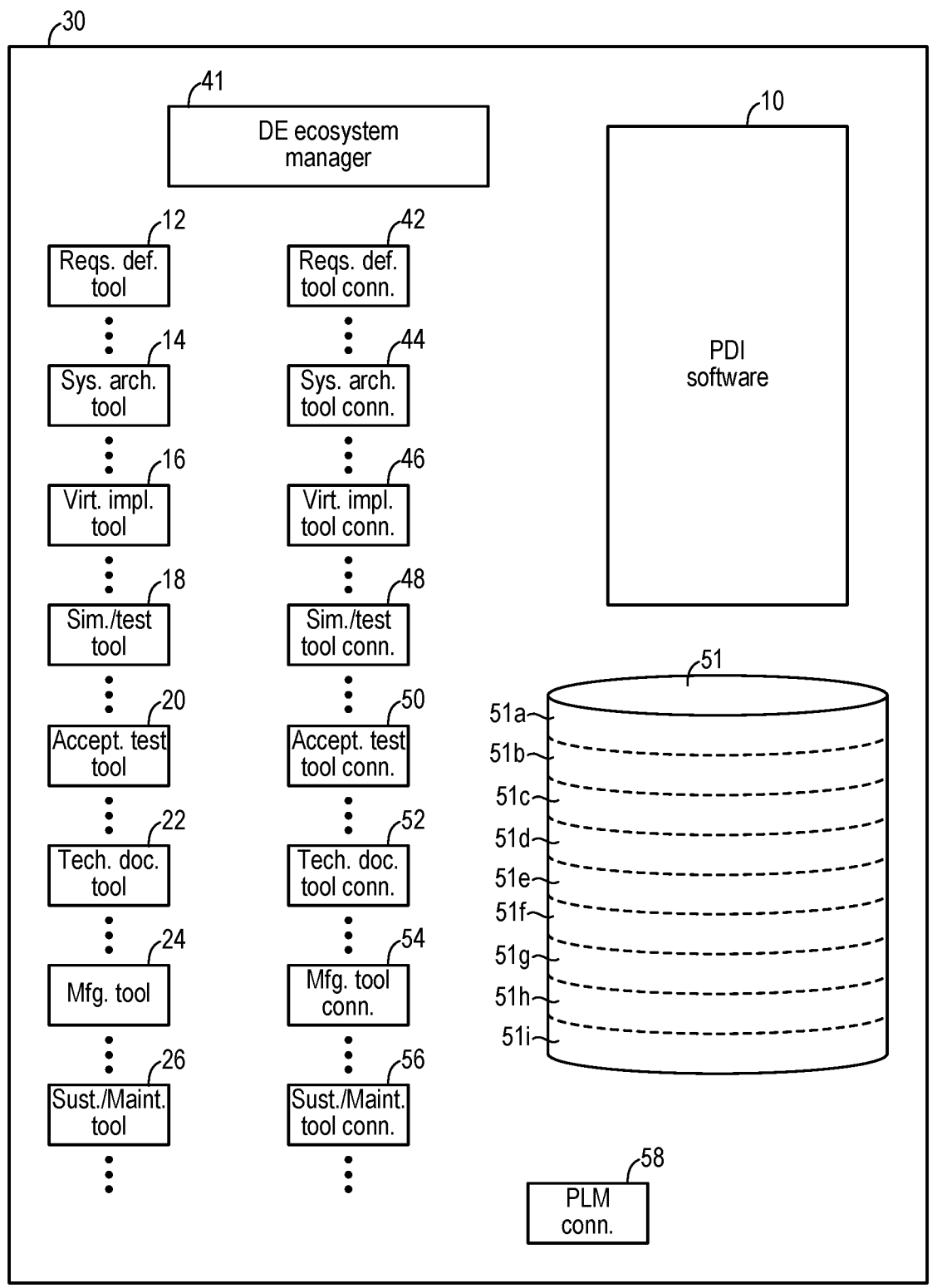
FIG. 3 is a diagram showing example digital engineering ecosystem software hosted on a computing system.

FIG. 3 is a diagram showing example DE ecosystem software hosted on the computing system 30. The software may comprise the requirements definition tool 12, a requirements definition tool connector 42, the system architecture tool 14, a system architecture tool connector 44, the virtual implementation tool 16, a virtual implementation tool connector 46, the simulation/test tool 18, a simulation/test connector 48, the acceptance testing tool 20, an acceptance testing tool connector 50, the technical documentation tool 22, a technical documentation tool connector 52, the manufacturing tool 24, a manufacturing tool connector 54, the sustainment/maintenance tool 26, a sustainment/maintenance tool connector 56, a PLM connector 58, the PDI software 10, and a DE ecosystem manager 41.

As also shown in FIG. 3, the computing system 30 may comprise a database 51 having one or more portions used to store certain types of data. For example, a first portion 51a of the database 51 may be used to store requirements data for a project, such as data output by the requirements definition tool 12. A second portion 51b of the database 51 may be used to store system architecture data for a project, such as data output by the system architecture tool 14. A third portion 51c of the database 51 may be used to store virtual implementation data for a project, such as data output by the virtual implementation tool 16. A fourth portion 51d of the database 51 may be used to store simulation/test data for a project, such as data output by the simulation/test tool 18. A fifth portion 51e of the database 51 may be used to store acceptance testing data for a project, such as data output by the acceptance testing tool 20. A sixth portion 51f of the database 51 may be used to store technical documentation data for a project, such as data output by the technical documentation tool 22. A seventh portion 51g of the database 51 may be used to store manufacturing data for a project, such as data output by the manufacturing tool 24. An eighth portion 51h of the database 51 may be used to store sustainment/maintenance data for a project, such as data output by the sustainment/maintenance tool 26. A ninth portion 51i of the database 51 may be used to store project data output by the PDI software 10. That project data may correspond to, and may integrate, data output by the tools 12, 14, 16, 18, 20, 22, 24, and 26. For example, the project data may map (or otherwise link) data elements of data in one or more the database portions 51a through 51h with data elements of data in one or more other database portions 51a through 51h. Although a single database 51 is shown in FIG. 3 for simplicity, multiple databases (e.g., implemented by multiple computing devices of the computing system 30) may be used to store data such as that described herein.

The requirements definition tool connector 42 may receive data output by the requirements definition tool 12. That output data may comprise data elements, generated by the requirements definition tool 12 based on inputs from the users of the requirements definition tool 12, that make up requirements defined for a project. The project requirements may be stored in the database portion 51a, as indicated above. However, at least a portion of the output data from the requirements definition tool 12 may be used to generate project data output by the PDI software 10. In particular, the requirements definition tool connector 42 may receive data output by the requirements definition tool 12 and may process at least a portion of that data to generate input data for the PDI software 10. Based on that input data, which the PDI software 10 may receive from the connector 42, the PDI software 10 may generate project data and store that project data in the database portion 51i.

The system architecture tool connector 44 may receive data output by the system architecture tool 14. That output data may comprise data elements, generated by the system architecture tool 14 based on inputs from the users of the system architecture tool 14, that make up a system architecture for the project. The project system architecture may be stored in the database portion 51b, as indicated above. However, at least a portion of the output data from the system architecture tool 14 may be used to generate project data output by the PDI software 10. In particular, the system architecture tool connector 44 may receive data output by the system architecture tool 14 and may process at least a portion of that data to generate input data for the PDI software 10. Based on that input data, which the PDI software 10 may receive from the connector 44, the PDI software 10 may generate project data and store that project data in the database portion 51i.

The virtual implementation tool connector 46 may receive data output by the virtual implementation tool 16. That output data may comprise data elements, generated by the virtual implementation tool 14 based on inputs from the users of the virtual implementation tool 16, that make up virtual models of components and/or subsystems (and/or the entire system) for the project. The virtual implementation data may be stored in the database portion 51c, as indicated above. However, at least a portion of the output data from the virtual implementation tool 16 may be used to generate project data output by the PDI software 10. In particular, the virtual implementation tool connector 46 may receive data output by the virtual implementation tool 16 and may process at least a portion of that data to generate input data for the PDI software 10. Based on that input data, which the PDI software 10 may receive from the connector 46, the PDI software 10 may generate project data and store that project data in the database portion 51i.

The simulation/test tool connector 48 may receive data output by the simulation/test tool 18. That output data may comprise data elements, generated by the simulation/test tool 18 based on inputs from the users of the simulation/test tool 18, that make up data for simulations performed on virtual models of components and/or subsystems (and/or the entire system) for the project and/or tests performed on physical elements. That simulation/test data may comprise results of the simulations and/or tests, configurations of simulations and/or tests (e.g., parameters and/or data models used), animations and/or other graphical or audio data generated during a simulation or test, and/or other types of data. The simulation/test data may be stored in the database portion 51d, as indicated above. However, at least a portion of the output data from the simulation/test tool 18 may be used to generate project data output by the PDI software 10. In particular, the simulation/test tool connector 48 may receive data output by the simulation/test tool 18 and may process at least a portion of that data to generate input data for the PDI software 10. Based on that input data, which the PDI software 10 may receive from the connector 48, the PDI software 10 may generate project data and store that project data in the database portion 51i.

The acceptance testing tool connector 50 may receive data output by the acceptance testing tool 20. That output data may comprise data elements, generated by the acceptance testing tool 20 based on inputs from the users of the acceptance testing tool 20, that make up acceptance testing data for a project. The acceptance testing data may be stored in the database portion 51e, as indicated above. However, at least a portion of the output data from the acceptance testing tool 20 may be used to generate project data output by the PDI software 10. In particular, the acceptance testing tool connector 50 may receive data output by the acceptance testing tool 20 and may process at least a portion of that data to generate input data for the PDI software 10. Based on that input data, which the PDI software 10 may receive from the connector 50, the PDI software 10 may generate project data and store that project data in the database portion 51i.

The technical documentation tool connector 52 may receive data output by the technical documentation tool 22. That output data may comprise data elements, generated by the technical documentation tool 22 based on inputs from the users of the technical documentation tool 22, that make up technical documentation data for a project. The technical documentation data may be stored in the database portion 51*f*, as indicated above. However, at least a portion of the output data from the technical documentation tool 22 may be used to generate project data output by the PDI software 10. In particular, the technical documentation tool connector 52 may receive data output by the technical documentation tool 22 and may process at least a portion of that data to generate input data for the PDI software 10. Based on that input data, which the PDI software 10 may receive from the connector 52, the PDI software 10 may generate project data and store that project data in the database portion 51*i*.

The manufacturing tool connector 54 may receive data output by the manufacturing tool 24. That output data may comprise data elements, generated by the manufacturing tool 24 based on inputs from the users of the manufacturing tool 24, that make up manufacturing data for a project. The manufacturing data may be stored in the database portion 51*g*, as indicated above. However, at least a portion of the output data from the manufacturing tool 24 may be used to generate project data output by the PDI software 10. In particular, the manufacturing tool connector 54 may receive data output by the manufacturing tool 24 and may process at least a portion of that data to generate input data for the PDI software 10. Based on that input data, which the PDI software 10 may receive from the connector 54, the PDI software 10 may generate project data and store that project data in the database portion 51*i*.

The sustainment/maintenance tool connector 56 may receive data output by the sustainment/maintenance tool 26. That output data may comprise data elements, generated by the sustainment/maintenance tool 26 based on inputs from the users of the sustainment/maintenance tool 26, that make up sustainment/maintenance data for a project. The sustainment/maintenance data may be stored in the database portion 51*h*, as indicated above. However, at least a portion of the output data from the sustainment/maintenance tool 26 may be used to generate project data output by the PDI software 10. In particular, the sustainment/maintenance tool connector 56 may receive data output by the sustainment/ maintenance tool 26 and may process at least a portion of that data to generate input data for the PDI software 10. Based on that input data, which the PDI software 10 may receive from the connector 56, the PDI software 10 may generate project data and store that project data in the database portion 51*i*.

As indicated by the vertical ellipses under the requirements definition tool 12 and the requirements definition tool connector 42, the DE ecosystem may comprise more than one requirements definition software tool and corresponding connector. Similarly, and as shown by the other ellipses, the DE ecosystem may comprise more than one system architecture software tool and corresponding connector, more than one virtual implementation software tool and corresponding connector, more than one simulation/test software tool and corresponding connector, more than one acceptance testing software tool and corresponding connector, more than one technical documentation software tool and corresponding connector, more than one manufacturing software tool and corresponding connector, and/or more than one sustainment/maintenance software tool and corresponding connector. For example, the DE ecosystem may be configured to allow a group of users to select which tool of each type that the group prefers. In addition to the types of tools shown in FIG. 3, the DE ecosystem may also comprise other types of tools and corresponding connectors. For example, the DE ecosystem may comprise a PLM connector 58. As explained below in connection with FIG. 8, the PLM connector 58 may interface the PDI software 10 and a separate (e.g., legacy) PLM system.

In addition to accessing the tools 12, 14, 16, 18, 20, 22, 24, and/or 26 (and/or other tools), users may also access the PDI software 10. For example, users may access the PDI software 10 to determine one or more requirements, generated using the requirements tool 12, related to data associated with one or more of the tools interfacing with the PDI software 10 (e.g., one or more portions of the system architecture, one or more virtual models, one or more simulations and/or tests, one or portions of acceptance testing data, one or more portion of technical documentation data, one or more portions of manufacturing data, one or more portions of sustainment/maintenance data, and/or to other types of data). In general, users may access the PDI software 10 to determine one or more portions of data, associated with any of the tools 12, 14, 16, 20, 22, 24, and/or 26 (and/or other tools), that may be related to any other data associated with any of the tools 12, 14, 16, 20, 22, 24, and/or 26 (and/or other tools).

The DE ecosystem manager 41 may comprise software to perform operations associated with providing users access to the DE ecosystem. For example, the DE ecosystem manager 41 may control login, verification and/or authentication of users, access control (e.g., limiting data available to specific users or groups of users), and other types of operations. The DE ecosystem manager 41 may monitor users' access (e.g., tools accessed, direct access of the PDI software 10, duration of login time or other temporal measure of access, amount of data transferred, etc.), and/or provide information from this monitoring for use in billing for access to the DE ecosystem. The DE ecosystem manager 41 may also or alternatively control instantiation of the DE ecosystem or portions thereof and/or access to an already-instantiated DE ecosystem or portions thereof. For example, the DE ecosystem manager 41 may comprise software configured to carry out operations such as are described in connection with FIGS. 6 and 7.

Figure 4A:
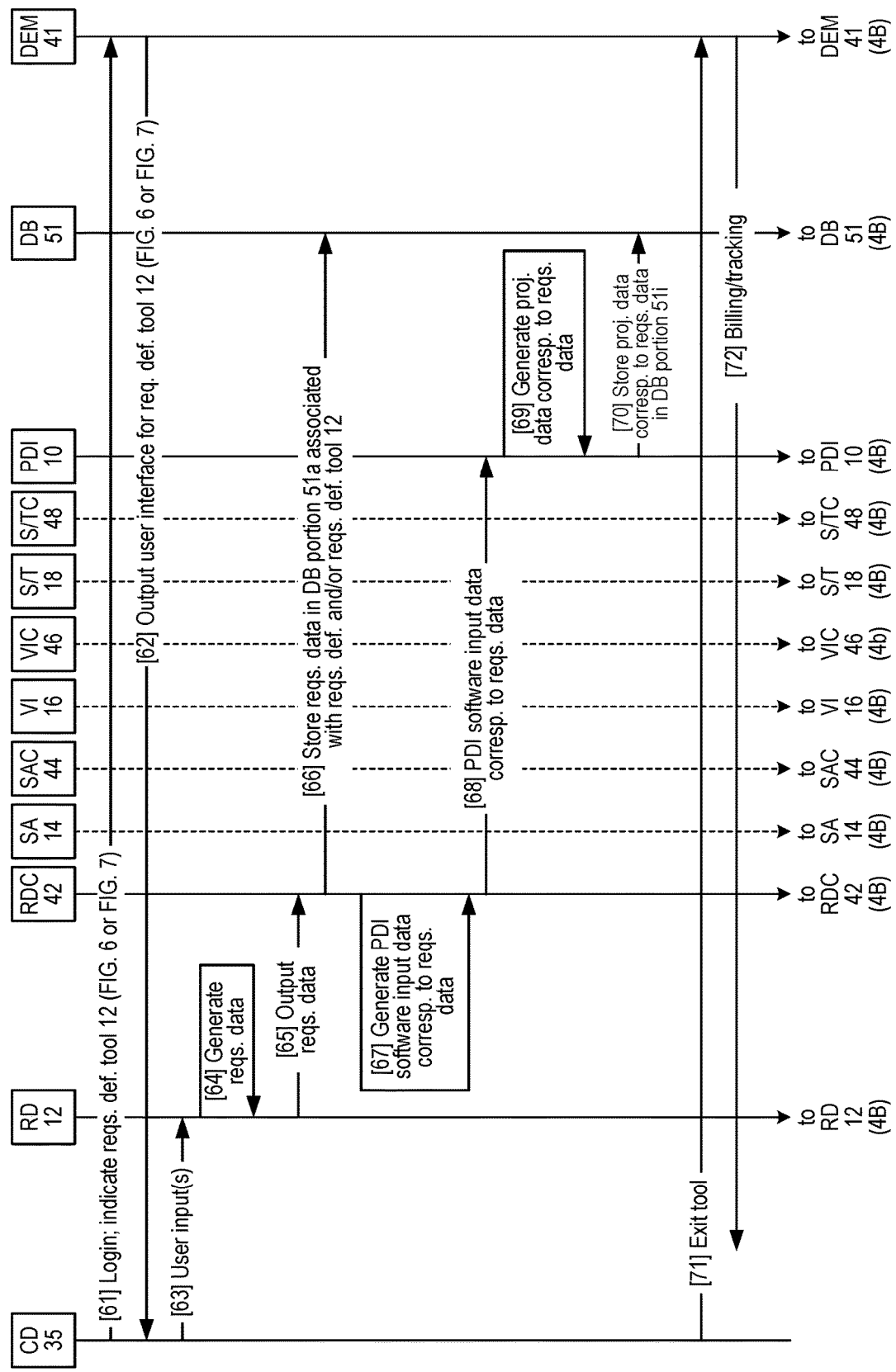
FIGS. 4A, 4B, 4C, and 4D are a sequence diagram showing use of an example digital engineering ecosystem and interaction of software of that example digital engineering ecosystem.

FIGS. 4A, 4B, 4C, and 4D are a sequence diagram showing use of an example DE ecosystem and interaction of software of that example DE ecosystem. In the sequence diagram of FIGS. 4A through 4D, various conventions are followed to accommodate limitations on what can be clearly shown in a single drawing figure. In each of FIGS. 4A through 4D, drawing elements representing portions of the example DE ecosystem that are not discussed in connection with that figure are moved closer together so as to allow greater separation between other drawing elements. As seen in FIG. 4A, for example, the drawing elements corresponding to the system architecture tool 14 (SA 14), the system architecture tool connector 44 (SAC 44), the virtual implementation tool 16 (VI 16), the virtual implementation tool connector 46 (VIT 46), the simulation/test tool 18 (S/T 18), and the simulation/test connector 48 (S/TC 48) are moved close to each other so as to allow greater separation between the drawing elements corresponding to the computing device 35 (CD 35) and the requirements definition tool 12 (RD 12), and between the drawing elements corresponding to the requirements definition tool 12 and the requirements definition tool connector 42 (RDC 42). Also, vertical lines associated with portions of the example DE system that are not discussed in connection with a drawing figure are shown in broken lines.

Figure 4B:
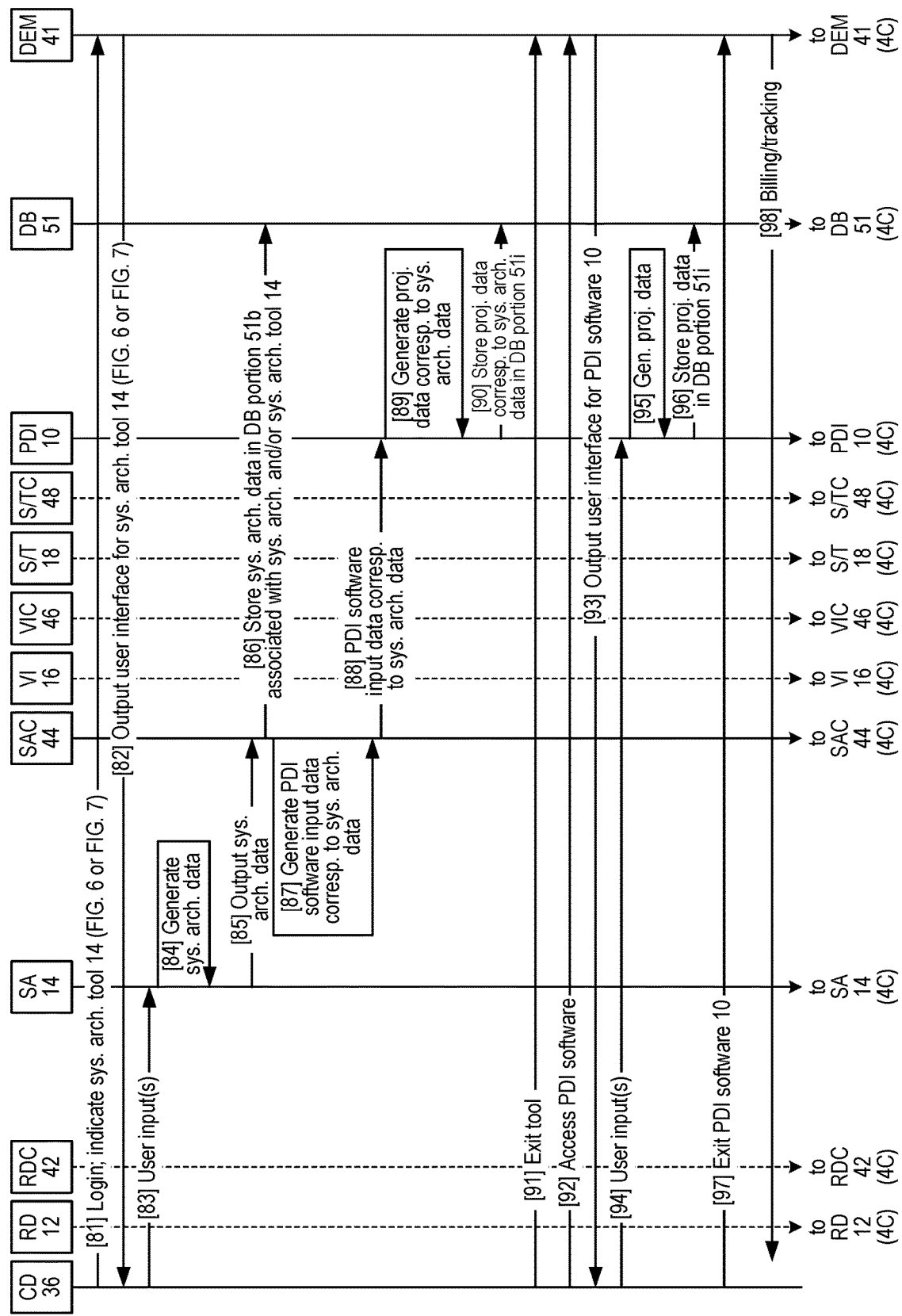
Figure 4C:
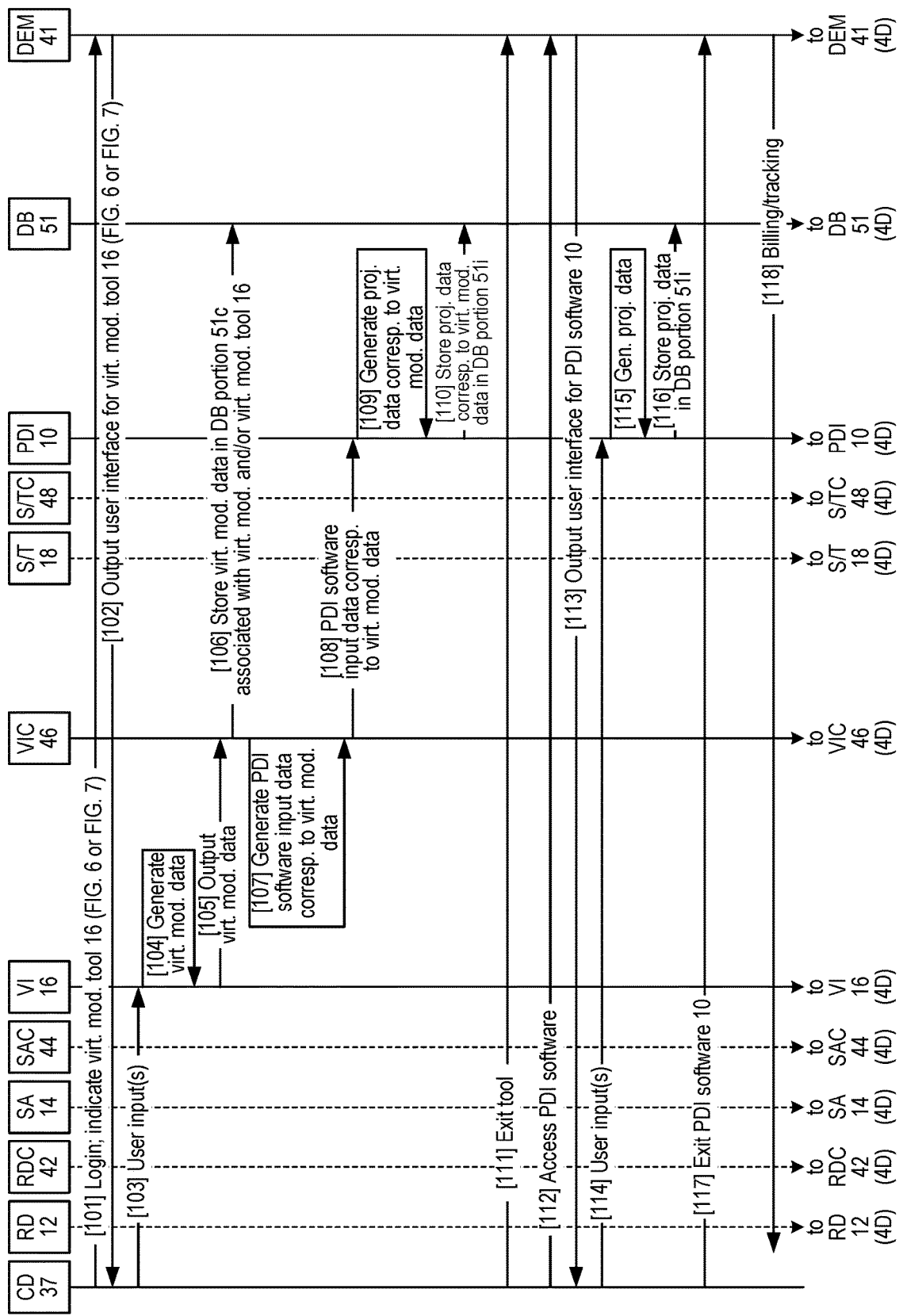
Figure 4D:
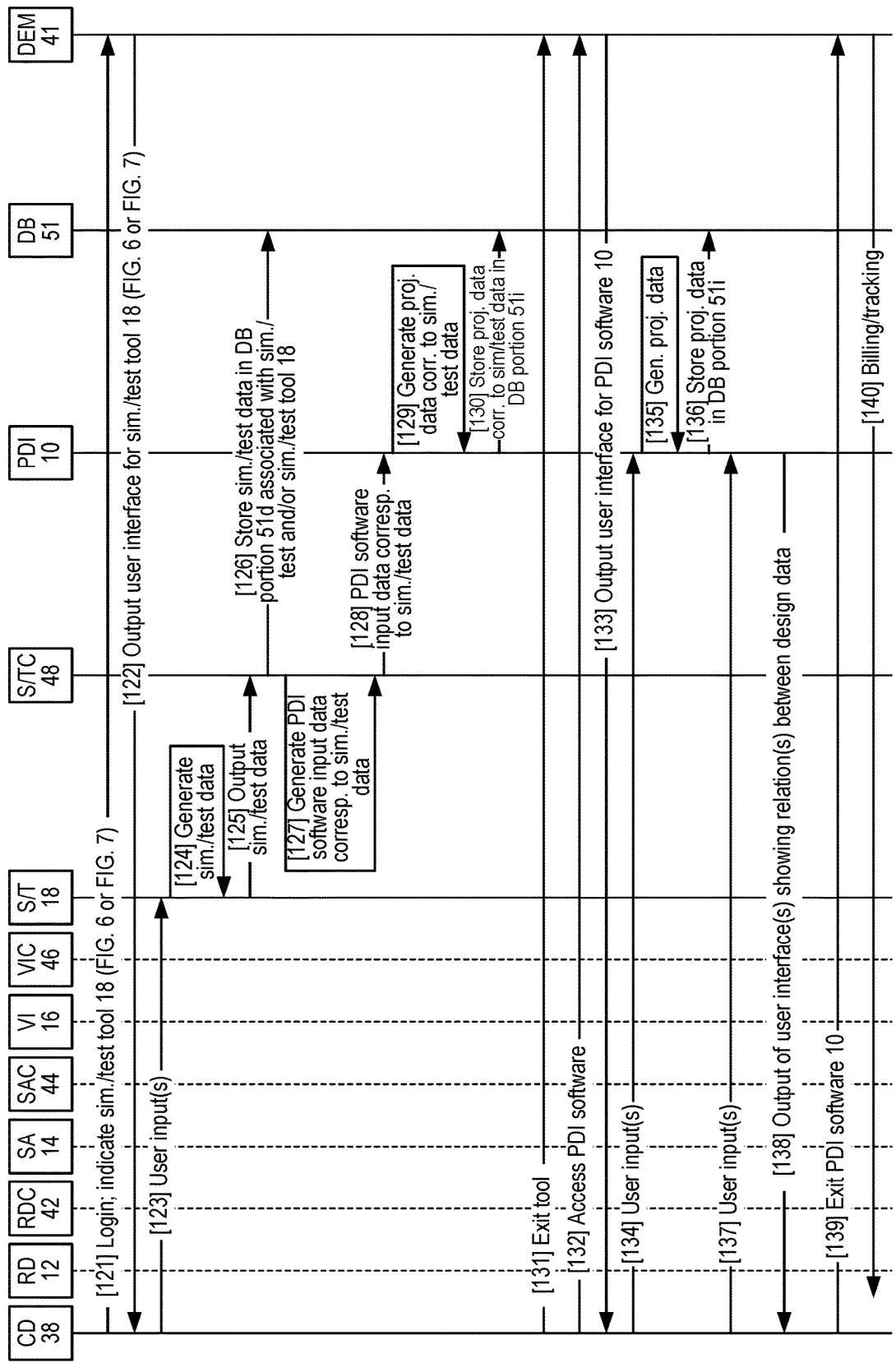

Moreover, the example uses and interactions shown by FIGS. 4A through 4D are simplified. For example, the examples of FIGS. 4A through 4D do not show activities associated with the acceptance testing tool 20, the acceptance testing tool connector 50, the technical documentation tool 22, the technical documentation tool connector 52, the manufacturing tool 24, the manufacturing tool connector 54, the sustainment/maintenance tool 26, or the sustainment/maintenance tool connector 56. However, activities associated with those tools and connectors may be similar to, and may have sequence flows similar to, those shown in FIGS. 4A through 4D. As another example, FIG. 4A shows use of a single tool by a single user, and each of FIGS. 4B through 4D shows use of a single tool and of the PDI software 10 by a single user. Each of the tools and/or the PDI software 10 may be simultaneously used by multiple users. As another example, FIGS. 4A through 4D show a sequence of requirements definition phase activity comprising use of the requirements definition tool 12, followed by system architecture phase activity comprising use of the system architecture tool 14, followed by virtual implementation phase activity comprising use of the system architecture tool 16, followed simulation/test phase activity comprising use of the simulation/test tool 18. Activities associated with some or all phases, which activity may comprise use of any or all of the tools 12, 14, 16, 18, 20, 22, 24, and/or 26 and/or use of the PDI software 10, may occur simultaneously and/or in any order.

In FIG. 4A, in step 61, the user computing device 35 may initiate access of the DE ecosystem. Step 61 may comprise communicating with the DE ecosystem manager 41 (DEM 41) to provide login information, to indicate the desired DE ecosystem tool to be accessed, to specify a project (e.g., if the user is associated with an enterprise that is using the DE ecosystem for multiple projects), and/or to provide other information. The user may provide the information in step 61, via a web interface of a browser, to a web page associated with the DE ecosystem. In the example of FIG. 4A, the user indicates that the requirements definition tool 12 is being accessed. In step 62, the DE ecosystem manager 41 causes the computing device 35 to output (e.g., via the web browser) one or more user interfaces for the requirements definition tool 12. Examples of operations that may be associated with steps 61 and 62 are described below in connection with FIGS. 6 and 7.

In step 63, the user may provide one or more inputs to the requirements definition tool 12. In step 64, and based on the user inputs of step 63, the requirements definition tool 12 may generate design requirements data for a project. In step 65, the requirements definition tool 12 may output some or all of the generated data for storage in the database 51. The data output in step 65 may comprise design data elements of project requirements data (e.g., data describing one or more project design requirements and/or aspects of one of more project design requirements).

The output data of step 65 may be received by the requirements definition tool connector 42. The requirements definition tool connector 42 may, in step 66, forward the data from step 65 (or a copy of that data) to the database 51 (DB 51) for storage in the database portion 51a associated with requirements data for the project and/or with the requirements definition tool 12. In step 67, the requirements definition tool connector 42 may generate, using the data from step 65, input data to the PDI software 10 that corresponds to the project requirements data of step 65. As part of step 67, the requirements definition tool connector 42 may, for each data element of the data from step 65, convert that data element to a corresponding data element type of the PDI software 10. In step 68, the requirements definition tool connector 42 may forward the input data generated in step 67 to the PDI software 10 (PDI 10).

In step 69, the PDI software 10 may generate, based on the input data from step 68, project data that corresponds to the project requirements data output by the requirements definition tool 12 in step 65. In step 70, the PDI software 10 may forward that generated project data to the database 51 for storage in the database portion 51i that corresponds to the project data and/or to the PDI software 10.

The operations of steps 63 through 70 may be repeated multiple times throughout a session as the user of the computing device 35 provides additional inputs to the requirements definition tool 12. At the conclusion of that session, the user may exit the requirements definition tool 12, as shown in step 71. This may cause the DE ecosystem manager 41 to log the user out and generate data that indicates the times the user logged in and logged out, a duration of the user's session, the tool used, an amount of data uploaded and/or downloaded, and/or other data measuring and/or tracking usage of the DE ecosystem by the user. At step 72, the DE ecosystem manager may forward some or all of this data to a computing device associated with an enterprise (e.g., an employer of the user of computing device 35) that is responsible for payment for use of the DE ecosystem. Also or alternatively, the data of step 72 may be stored and sent at periodic or other intervals.

In FIG. 4B, in step 81, the user computing device 36 may initiate access of the DE ecosystem. Step 81 may be similar to step 61 of FIG. 4A, except that the user of the computing device 36 may request access to the system architecture tool 14 instead of the requirements definition tool 12. In step 82, the DE ecosystem manager 41 may cause the computing device 36 to output (e.g., via a web browser) one or more user interfaces for the system architecture tool 14.

In step 83, the user may provide one or more inputs to the system architecture tool 14. In step 84, and based on the user inputs of step 83, the system architecture tool 14 may generate system architecture data for the project. In step 85, the system architecture tool 14 may output some or all of the generated data for storage in the database 51. The data output in step 85 may comprise design data elements of system architecture data (e.g., data describing one or more aspects of the project system architecture).

The output data of step 85 may be received by the system architecture tool connector 44. The system architecture tool connector 44 may, in step 86, forward the data from step 85 (or a copy of that data) to the database 51 for storage in the database portion 51b associated with system architecture data for the project and/or with the system architecture tool 14. In step 87, the system architecture tool connector 44 may generate, using the data from step 85, input data to the PDI software 10 that corresponds to the system architecture data of step 85. As part of step 87, the system architecture tool connector 44 may, for each data element of the data from step 85, convert that data element to a corresponding data element type of the PDI software 10. In step 88, the system architecture tool connector 44 may forward the input data generated in step 87 to the PDI software 10.

In step 89, the PDI software 10 may generate, based on the input data from step 88, project data that corresponds to the system architecture data output by the system architecture tool 14 in step 85. In step 90, the PDI software 10 may forward that generated project data to the database 51 for storage in the database portion 51i that corresponds to the project data and/or to the PDI software 10.

The operations of steps 83 through 90 may be repeated multiple times throughout a session as the user of the computing device 36 provides additional inputs to the system architecture tool 14. At the conclusion of that session, the user may exit the system architecture tool 12, as shown in step 91. This may cause the DE ecosystem manager 41 to log the user out and generate data that indicates the times the user logged in and logged out, a duration of the user's session, the tool used, an amount of data uploaded and/or downloaded, and/or other data measuring and/or tracking usage of the DE ecosystem by the user. Although not shown, the DE ecosystem manager 41 may (e.g., in a manner similar to that shown in connection with step 72) forward some or all of this data to a computing device associated with an enterprise that is responsible for payment for use of the DE ecosystem. Also or alternatively, such data may be stored and sent at periodic or other intervals.

At step 92, the user of the computing device 36 (and/or a different user of a different computing device), may provide input requesting access to the PDI software 10. In step 93, the DE ecosystem manager 41 may cause the computing device 36 (and/or the different computing device of the different user) to output (e.g., via a web browser) one or more user interfaces for the PDI software 10. At step 94, the user may provide one or more inputs to the PDI software 10. The inputs may, for example, comprise inputs that link one or more portions of the project system architecture (e.g., data stored in step 90 and/or data stored in step 86) to one or more portions of the project system requirements (e.g., data stored in step 70 and/or data stored in step 66). In step 95, the PDI software 10 may generate, based on the inputs of step 94, additional project data. The additional project data generated in step 95 may, for example, link one or more project requirements (and/or associated project requirements data stored in the database portion 51a) and one or more aspects of project system architecture (and/or associated system architecture data stored in the database portion 51b). In step 96, the PDI software 10 may forward the additional project data generated in step 95 to the database 51 for storage in the database portion 51i that corresponds to the project data and/or to the PDI software 10. In step 97, the user may exit the PDI software 10. This may cause the DE ecosystem manager 41 to log the user out and generate data that indicates the times the user logged in and logged out, a duration of the user's use of the PDI software 10, an amount of data uploaded and/or downloaded, and/or other data measuring and/or tracking usage of the DE ecosystem by the user. At step 98, the DE ecosystem manager may forward some or all of this data to a computing device associated with an enterprise (e.g., an employer of the user of computing device 36) that is responsible for payment for use of the DE ecosystem. Also or alternatively, the data of step 98 may be stored and sent at periodic or other intervals.

In FIG. 4C, in step 101, the user computing device 37 may initiate access of the DE ecosystem. Step 101 may be similar to step 61 of FIG. 4A, except that the user of the computing device 37 may request access to the virtual implementation tool 16 instead of the requirements definition tool 12. In step 102, the DE ecosystem manager 41 may cause the computing device 37 to output (e.g., via a web browser) one or more user interfaces for the virtual implementation tool 16.

In step 103, the user may provide one or more inputs to the virtual implementation tool 16. In step 104, and based on the user inputs of step 103, the virtual implementation tool 16 may generate modelling data for the project. In step 105, the virtual implementation tool 16 may output some or all of the generated data for storage in the database 51. The data output in step 105 may comprise design data elements of project modelling data (e.g., data describing models of one or more components or subsystems of the project).

The output data of step 105 may be received by the virtual implementation tool connector 46. The virtual implementation tool connector 46 may, in step 106, forward the data from step 105 (or a copy of that data) to the database 51 for storage in the database portion 51c associated with virtual implementation data for the project and/or with the virtual implementation tool 16. In step 107, the virtual implementation tool connector 46 may generate, using the data from step 105, input data to the PDI software 10 that corresponds to the virtual implementation data of step 105. As part of step 107, the virtual implementation tool connector 46 may, for each data element of the data from step 105, convert that data element to a corresponding data element type of the PDI software 10. In step 108, the virtual implementation tool connector 46 may forward the input data generated in step 107 to the PDI software 10.

In step 109, the PDI software 10 may generate, based on the input data from step 108, project data that corresponds to the virtual implementation data output by the virtual implementation tool 16 in step 105. In step 110, the PDI software 10 may forward that generated project data to the database 51 for storage in the database portion 51i that corresponds to the project data and/or to the PDI software 10.

The operations of steps 103 through 110 may be repeated multiple times throughout a session as the user of the computing device 37 provides additional inputs to the virtual implementation tool 16. At the conclusion of that session, the user may exit the virtual implementation tool 16, as shown in step 111. This may cause the DE ecosystem manager 41 to log the user out and generate data such as that described in connection with step 91, and/or to forward some or all of that data, as also described in connection with 91.

At step 112, the user of the computing device 37 (and/or a different user of a different computing device), may provide input requesting access to the PDI software 10. In step 113, the DE ecosystem manager 41 may cause the computing device 37 (and/or the different computing device of the different user) to output (e.g., via a web browser) one or more user interfaces for the PDI software 10. At step 114, the user may provide one or more inputs to the PDI software 10. The inputs may, for example, comprise inputs that link one or more portions of the project virtual implementation (e.g., data stored in step 110 and/or data stored in step 106) to one or more portions of the project system architecture (e.g., data stored in step 90 and/or data stored in step 86) and/or to one or more portions of the project requirements (e.g., data stored in step 70 and/or data stored in step 66). In step 115, the PDI software 10 may generate, based on the inputs of step 114, additional project data. The additional project data generated in step 115 may, for example, link one or more project virtual implementations (and/or associated virtual implementation data stored in the database portion 51c) and one or more project requirements (and/or associated project requirements data stored in the database portion 51a) and/or one or more aspects of project system architecture (and/or associated system architecture data stored in the database portion 51b). In step 116, the PDI software 10 may forward the additional project data generated in step 115 to the database 51 for storage in the database portion 51i that corresponds to the project data and/or to the PDI software 10. In step 117, the user may exit the PDI software 10. This may cause the DE ecosystem manager 41 to log the user out and generate data such as that described in connection with step 97. At step 118, the DE ecosystem manager may forward some or all of this data, as described in connection with step 98. Also or alternatively, the data of step 118 may be stored and sent at periodic or other intervals.

In FIG. 4D, in step 121, a user of the computing device 38 may initiate access of the DE ecosystem. Step 121 may be similar to step 61 of FIG. 4A, except that the user of the computing device 38 may request access to the simulation/test tool 18 instead of the requirements definition tool 12. In step 122, the DE ecosystem manager 41 may cause the computing device 38 to output (e.g., via a web browser) one or more user interfaces for the simulation/test tool 18.

In step 123, the user may provide one or more inputs to the simulation/test tool 18. In step 124, and based on the user inputs of step 123, the simulation/test tool 18 may generate simulation and/or test data for the project. In step 125, the simulation/test tool 18 may output some or all of the generated data for storage in the database 51. The data output in step 125 may comprise design data elements of project simulation and/or test data (e.g., data describing simulation associated with one or more models of one or more components or subsystems of the project, and/or data describing tests associated with the project).

The output data of step 125 may be received by the simulation/test tool connector 48. The simulation/test tool connector 48 may, in step 126, forward the data from step 125 (or a copy of that data) to the database 51 for storage in the database portion 51d associated with simulation/test data for the project and/or with the simulation/test tool 18. In step 127, the simulation/test tool connector 48 may generate, using the data from step 125, input data to the PDI software 10 that corresponds to the simulation/test data of step 125. As part of step 127, the simulation/test tool connector 48 may, for each data element of the data from step 125, convert that data element to a corresponding data element type of the PDI software 10. In step 128, the simulation/test tool connector 48 may forward the input data generated in step 127 to the PDI software 10.

In step 129, the PDI software 10 may generate, based on the input data from step 128, project data that corresponds to the simulation/test data output by the simulation/test tool 18 in step 125. In step 130, the PDI software 10 may forward that generated project data to the database 51 for storage in the database portion 51i that corresponds to the project data and/or to the PDI software 10.

The operations of steps 123 through 130 may be repeated multiple times throughout a session as the user of the computing device 38 provides additional inputs to the simulation/test tool 18. At the conclusion of that session, the user may exit the simulation/test tool 18, as shown in step 131. This may cause the DE ecosystem manager 41 to log the user out and generate data such as that described in connection with step 91, and/or to forward some or all of that data, as also described in connection with step 91.

At step 132, the user of the computing device 38 (and/or a different user of a different computing device), may provide input requesting access to the PDI software 10. In step 133, the DE ecosystem manager 41 may cause the computing device 38 (and/or the different computing device of the different user) to output (e.g., via a web browser) one or more user interfaces for the PDI software 10. At step 134, the user may provide one or more inputs to the PDI software 10. The inputs may, for example, comprise inputs that link one or more portions of simulation and/or test data for the project (e.g., data stored in step 130 and/or data stored in step 126) to one or more portions of the project virtual implementation (e.g., data stored in step 110 and/or data stored in step 106), to one or more portions of the project system architecture (e.g., data stored in step 90 and/or data stored in step 86), and/or to one or more portions of the project requirements (e.g., data stored in step 70 and/or data stored in step 66). In step 135, the PDI software 10 may generate, based on the inputs of step 134, additional project data. The additional project data generated in step 135 may, for example, link one or more project simulations and/or tests (and/or associated simulation and/or test data stored in the database portion 51d), one or more project virtual implementations (and/or associated virtual implementation data stored in the database portion 51c), one or more aspects of the project system architecture (and/or associated system architecture data stored in the database portion 51b), and/or one or more project requirements (and/or associated project requirements data stored in the database portion 51a). In step 136, the PDI software 10 may forward the additional project data generated in step 135 to the database 51 for storage in the database portion 51i that corresponds to the project data and/or to the PDI software 10.

In step 137, the user may provide one or more additional inputs to the PDI software 10. The inputs of step 137 may request access to one or more user interfaces via which the user may view relationships between project design data elements associated with different tools. Based on the inputs of step 137, the PDI software 10 may cause output, via the computing device 38, of one or more user interfaces that indicate relationships between design features associated with different types of project data. Those different types of project data may be based on data from two or more of the tools 12, 14, 16, 18, 20, 22, and 24. Those relationships may be based on inputs such as those of steps 94, 114, and/or 134, and/or based on other inputs. An example of an interface via which relationships between design features associated with different types of project data may be indicated is described below in connection with FIG. 5.

In step 138, the user may exit the PDI software 10. This may cause the DE ecosystem manager 41 to log the user out and generate data such as that described in connection with step 97. At step 139, the DE ecosystem manager may forward some or all of this data to a computing device, as described in connection with step 98. Also or alternatively, the data of step 138 may be stored and sent at periodic or other intervals.

As indicated above, activities associated with the acceptance testing tool 20, the acceptance testing tool connector 50, the technical documentation tool 22, the technical documentation tool connector 52, the manufacturing tool 24, the manufacturing tool connector 54, the sustainment/maintenance tool 26, and/or the sustainment/maintenance tool connector 56 may be similar to those shown in FIGS. 4A through 4D. Data generated using tools 20, 22, 24, and 26 may be stored in portions of the database associated with those tools (database portions 50e, 50f, 50g, and 50h, respectively), PDI software input data may be generated based on data from those tools, and project data based on that PDI software input data may be generated and stored in the database portion 51i. Moreover, and similar to steps 92-96 (FIG. 4B), steps 112-116 (FIG. 4C), and steps 132-136 (FIG. 4D), users may access (e.g., via computing devices such as the computing devices 36-38) the PDI software 10 to access and/or create project data related to acceptance testing, technical documentation, manufacturing, and/or sustainment/maintenance. In general, the PDI software 10 may be used to access, create, and/or or modify project data related to data from any of the tools 12, 14, 16, 18, 20, 22, 24, and/or 26. Such accessing, creating, and/or modifying may comprise creating (or modifying) links between (i) project data (e.g., stored in the database portion 51*i*) related to data from any of the tools 12, 14, 16, 18, 20, 22, 24, and/or 26 and (ii) any other project data (e.g., stored in the database portion 51*i*) related to data from any of the tools 12, 14, 16, 18, 20, 22, 24, and/or 26. Such accessing, creating, and/or modifying may comprise creating (or modifying) links between (i) project data (e.g., stored in the database portion 51*i*) related to data from any of the tools 12, 14, 16, 18, 20, 22, 24, and/or 26 and (ii) data from any of the tools 12, 14, 16, 18, 20, 22, 24, and/or 26 (e.g., stored in any of the database portions 51*a*-51*h* and/or in the database portion 51*i*). Such accessing, creating, and/or modifying may comprise creating (or modifying) links between (i) data from any of the tools 12, 14, 16, 18, 20, 22, 24, and/or 26 (e.g., stored in any of the database portions 51*a*-51*h* and/or in the database portion 51*i*) and (ii) any other data from any of the tools 12, 14, 16, 18, 20, 22, 24, and/or 26 (e.g., stored in any of the database portions 51*a*-51*h* and/or in the database portion 51*i*).

Figure 5:
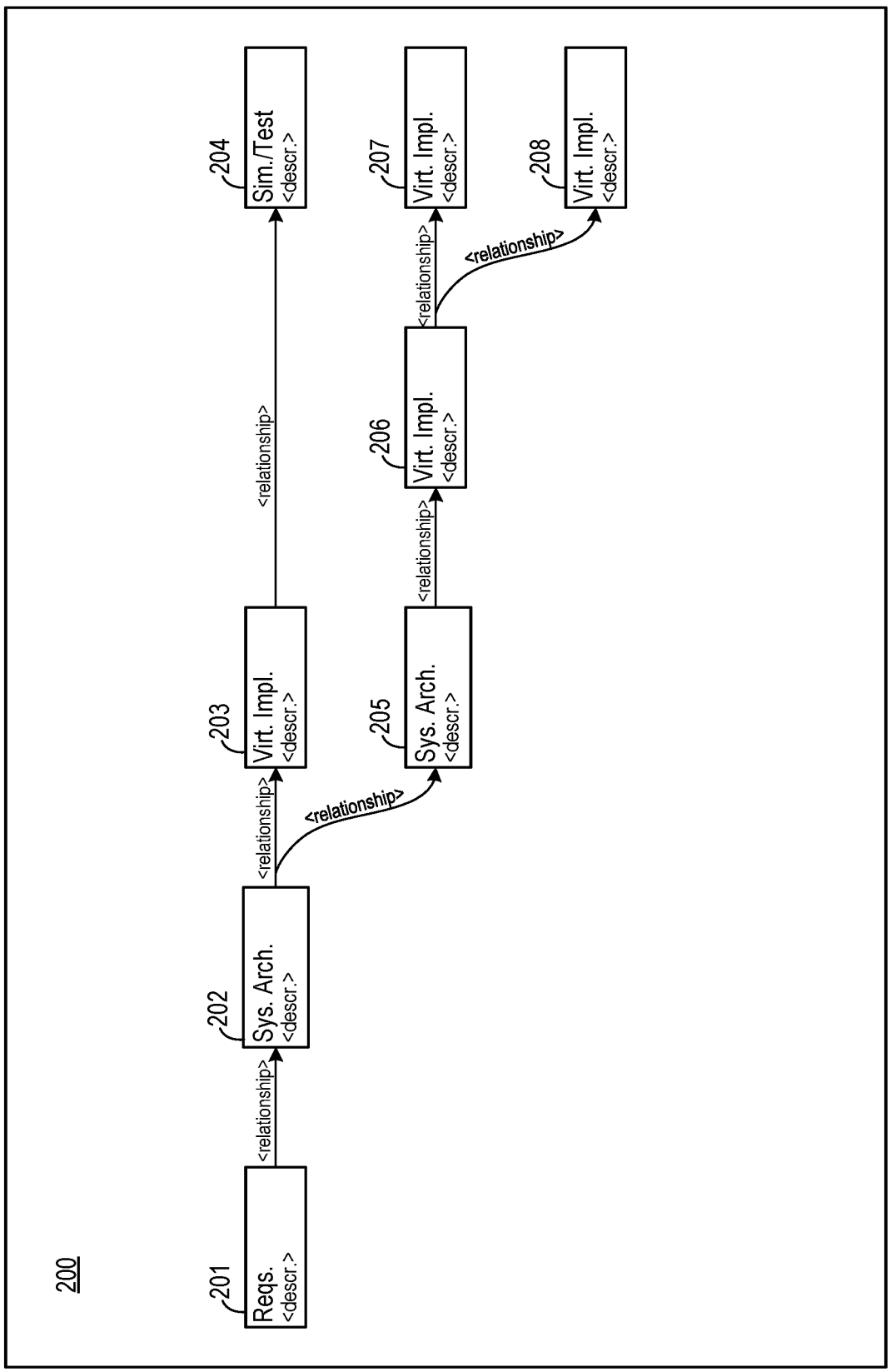
FIG. 5 shows an example user interface.

FIG. 5 shows an example user interface 200 that may be associated with the PDI software 10 and that may be output by the PDI software 10 to a computing device (e.g., via a web interface) such as the computing devices 35 through 38 (e.g., as part of steps 93, 113, and/or 133). The user interface 10 may show one or more nodes such as the nodes 201 through 208. A node (e.g., node 201) may, for example, correspond to a project design requirement or some portion of a project design requirement. A node (e.g., nodes 202 and 205) may, for example, correspond to a system, subsystem, or some other portion of a project system architecture. A node (e.g., nodes 203, 206, 207, 208) may, for example, correspond to a CAD representation or other virtual model of a system, subsystem, or component of a project. A node (e.g., node 204) may, for example, correspond to data associated with a simulation or test associated with some portion of a project. Each node may include a brief description, and may be selectable to obtain additional information about the node. For example, selecting a node may cause output of additional text describing the node and/or the project data represented by the node, output of graphics associated with the node and/or the project data associated with the node, etc. As another example, selecting a node may invoke a viewer window that shows data, corresponding to the node, as output by a tool (e.g., one of tools 12, 14, 16, 18, 20, 22, 24, and/or 26) associated with that data.

Arrows may link nodes and indicate relationships between nodes connected by arrows. The example of FIG. 5 is simplified for purposes of explanation and does not show all possible types of nodes. For example, there may be multiple types of nodes associated with project requirements, multiple types of nodes associated with a project system architecture, multiple types of nodes associated with project virtual implementations, multiple types of nodes associated with project simulations and/or tests, and/or other types of nodes. There may also be links between nodes other than as shown in FIG. 5. For example, there may be one or more links between any type of node and any other type of node. Examples of relationships may, for example, comprise "satisfied by" (e.g., a requirement may be satisfied by a system architecture or portion thereof), "derived by" (e.g., a lower level requirement may be derived from a higher level requirement), "verified by" (e.g., a requirement may be verified by a simulation or test), "designed by" (e.g., a virtual implementation may design a portion of a system architecture), "composed of" (e.g., a system, subsystem, or component may be composed of multiple other components), and/or other types of relationships.

The example interface of FIG. 5 is merely one example of a user interface of the PDI software 10. There may be additional types of user interfaces associated with the PDI software 10 and that may be outputtable to computing devices accessing a DE ecosystem as described herein.

A DE ecosystem may comprise a private DE ecosystem or a shared DE ecosystem. A private DE ecosystem may be hosted via one or more containers (or other virtual implementation(s)) that are reserved for use by a single enterprise (e.g., a single corporation), and that are not shared with other enterprises. A shared DE ecosystem may be hosted via one or more containers (or other virtual implementation(s)) that are shared by multiple enterprises. In a shared DE ecosystem, data associated with each of the enterprises sharing the DE ecosystem may be protected from access by other enterprises using one or more types of access control.

Figure 6:
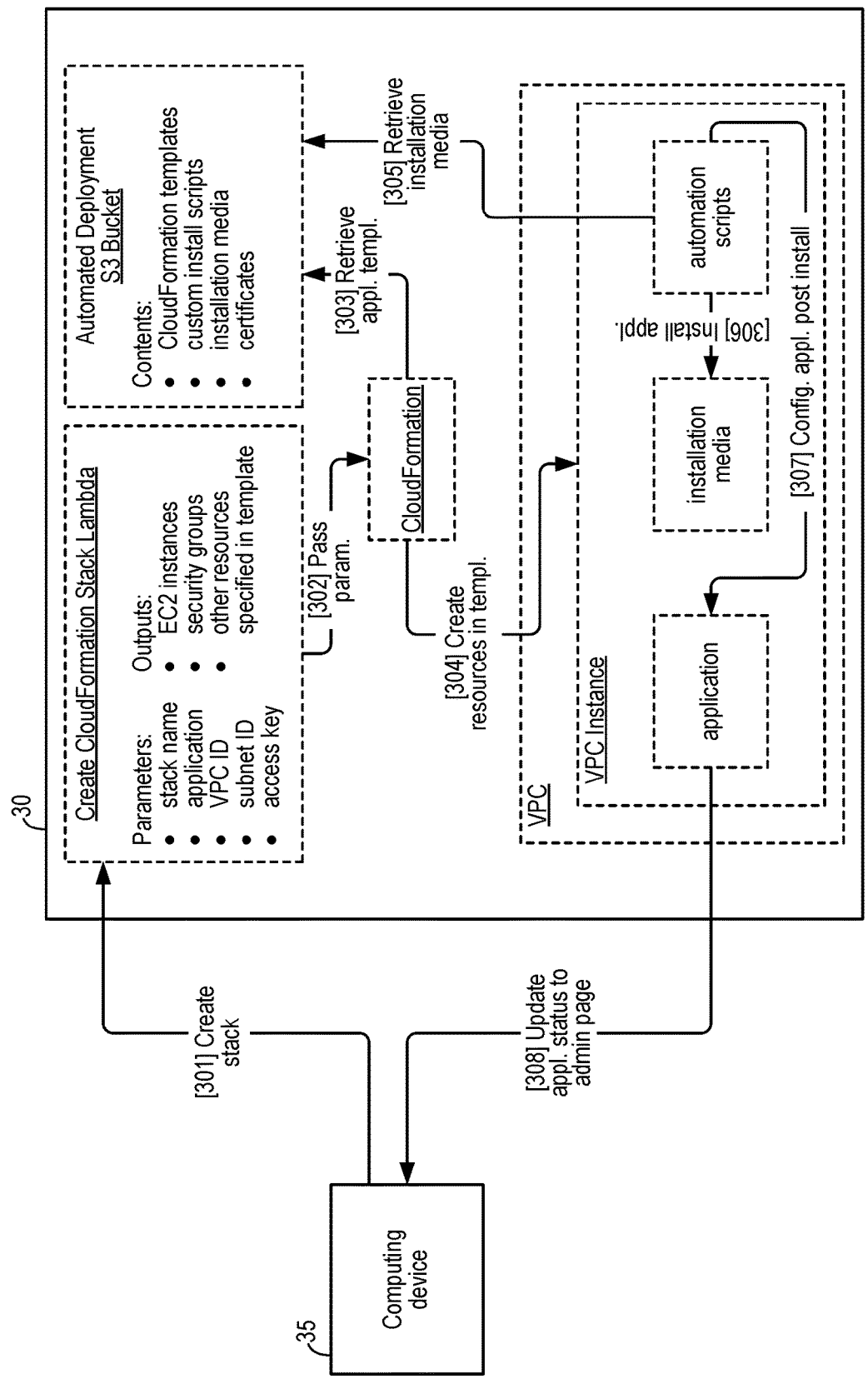
FIG. 6 is a diagram showing an example process for instantiating a private digital engineering ecosystem.

FIG. 6 is a diagram showing an example process for instantiating a private DE ecosystem. In the example of FIG. 6, the private DE ecosystem is hosted using Amazon Web Services® (AWS) cloud computing hosting services, and described using names of various applications and/or services associated with those particular cloud computing hosting services. However, DE ecosystems such as those described herein may also or alternatively be hosted using other types of commercially available hosting services and/or platforms, and/or using an enterprise's private cloud platform.

In step 301, using an administrative web page of a web application associated with the DE ecosystem, parameters may be passed by the computing device 35 (or by another computing device, e.g., one of the computing devices 36 through 38) to the computing system 30 to obtain, using the AWS "lambda" function, a parameters for creating a CloudFormation stack. The CloudFormation stack may comprise a collection of resources that will be used by the instantiated DE ecosystem. The parameters passed in step 301 may comprise a stack name, an identifier of a selected application (e.g., one or more tools 12, 14, 16, 18, 20, 22, 24, or 26 or the PDI software 10), an identifier for a virtual private cloud (VPC) that will be associated with the DE ecosystem, a subnet ID (e.g., an address range of the VPC that will be used for an EC2 (virtual server) instance associated with the DE ecosystem), and an access key.

The AWS lambda function may look up the appropriate template for the selected application and, in step 302, pass the resource parameters to the CloudFormation service. Those parameters may comprise the EC2 instance for the DE ecosystem, one or more security groups, and other resources in the template for the selected application (e.g., a connector associated with the selected application). In step 303, the CloudFormation service may retrieve, from an AWS S3 bucket (AWS data storage service) associated automated deployment, a CloudFormation template, installation scripts to install the selected application and other resources (e.g., the corresponding connector, the PDI software 10), and certificates.

In step 304, the CloudFormation service creates the EC2 instance for the DE ecosystem and provisions the EC2 instance with installation scripts and certificates retrieved in step 303. In step 305, the installation scripts loaded by the CloudFormation service download installation media (one or more installation files containing code for the selected application and connector) and configuration scripts. In step 306, the installation scripts install the selected application and connector and pass any parameters needed during that installation. In step 307, the installation and/or configuration scripts update configuration files and set up DNS (domain name service) and SSL (secure socket layer) to be used by the application. On completion, the application is started. In step 308, the application status may be posted to the administrative page. Step 308 may be repeated throughout the performance of steps 302 through 307 to update the status of the application.

If the selected application is one of the tools 12, 14, 16, 18, 20, 22, 24, or 26, and so that the PDI software 10 may interact with the selected tool (e.g., as described in connection with FIGS. 4A through 4D), the PDI software 10 may also be installed and configured as part of the process. For example, the installation and/or configuration scripts retrieved in step 303 and loaded in step 305 may comprise scripts to install and configure the PDI software 10. In step 305, installation media for the PDI software 10 may also be retrieved, and the PDI software 10 may also be installed and configured in steps 306 and 307.

Figure 7:
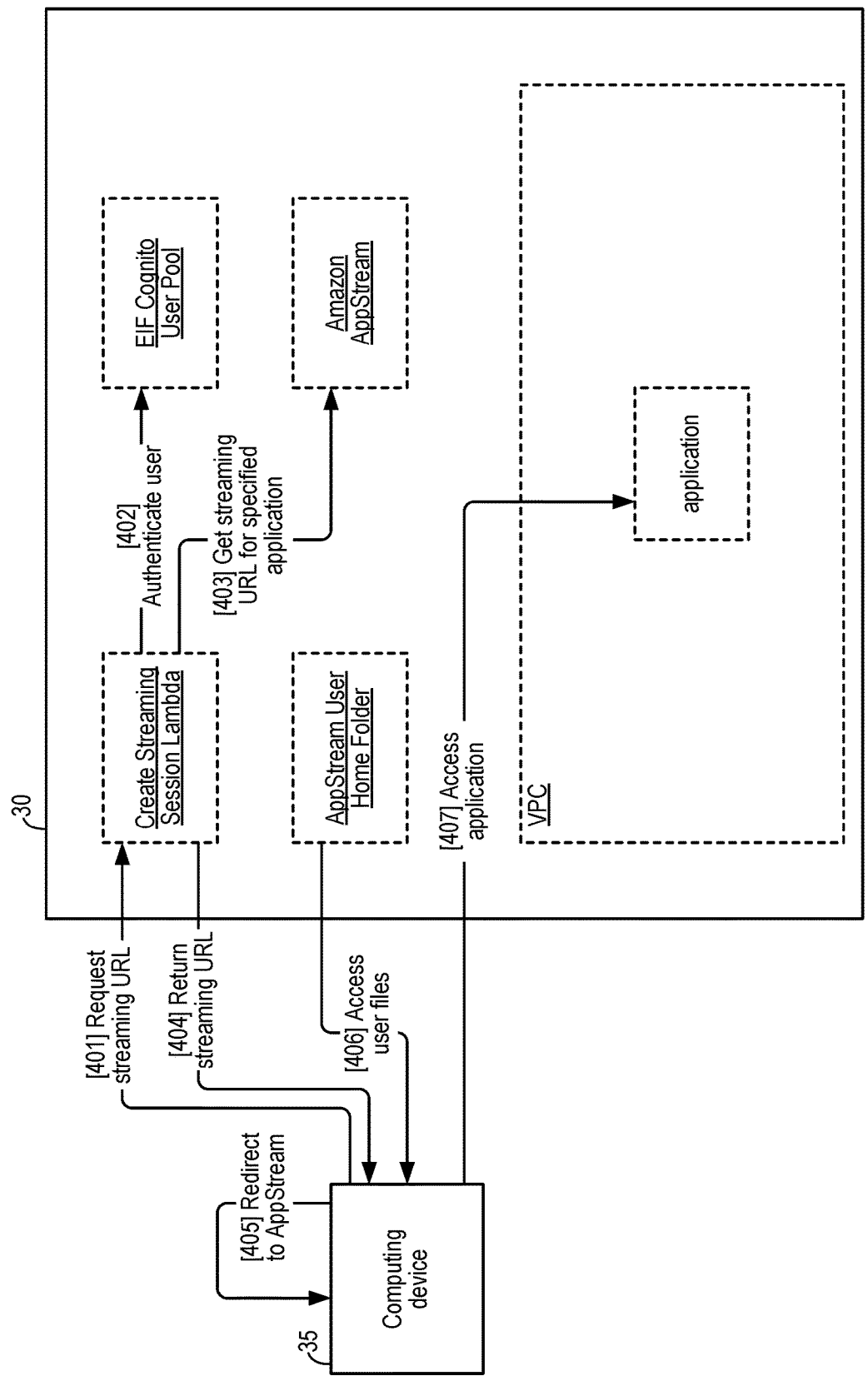
FIG. 7 is a diagram showing an example process for accessing a shared digital engineering ecosystem.

FIG. 7 is a diagram showing an example process for accessing a shared DE ecosystem. In the example of FIG. 7, the shared DE ecosystem is also hosted using Amazon Web Services® (AWS) cloud computing hosting services, and described using names for of various applications and/or services associated with those particular cloud computing hosting services. However, DE ecosystems such as those described herein may also or alternatively be hosted using other types of commercially available hosting services and/or platforms, and/or using an enterprise's private cloud platform.

In step 401, using an administrative web page of a web application associated with the DE ecosystem, parameters are passed by the computing device 35 (or by another computing device, e.g., one of the computing devices 36 through 38) to the computing system 30 to obtain, using the AWS "lambda" function, a redirect to a streaming URL associated with a selected application (e.g., one of the tools 12, 14, 16, 18, 20, 22, 24, or 26 or the PDI software 10). The parameters may include an identification of the selected application, an identifier of a user account, and an access token. In step 402, the user may be authenticated (e.g., using the AWS Cognito service). In step 403, a streaming URL for the selected application may be obtained from the AWS AppStream service. In step 404, the streaming URL may be returned to the computing device 35. In step 405, the computing device 35 is redirected to a streaming session for the selected application. In step 406, the user may access files from a home folder associated with the user. In step 407, the user may access the selected application. The selected application may comprise one of the tools 12, 14, 16, 18, 20, 22, 24, or 26 or the PDI software 10. The tools 12, 14, 16, 18, 20, 22, 24, and 26, and the PDI software 10, as well the connectors 41, 44, 46, 48, 50, 52, 54, and 56, may have been previously installed as part of setting up the shared DE ecosystem.

Figure 8:
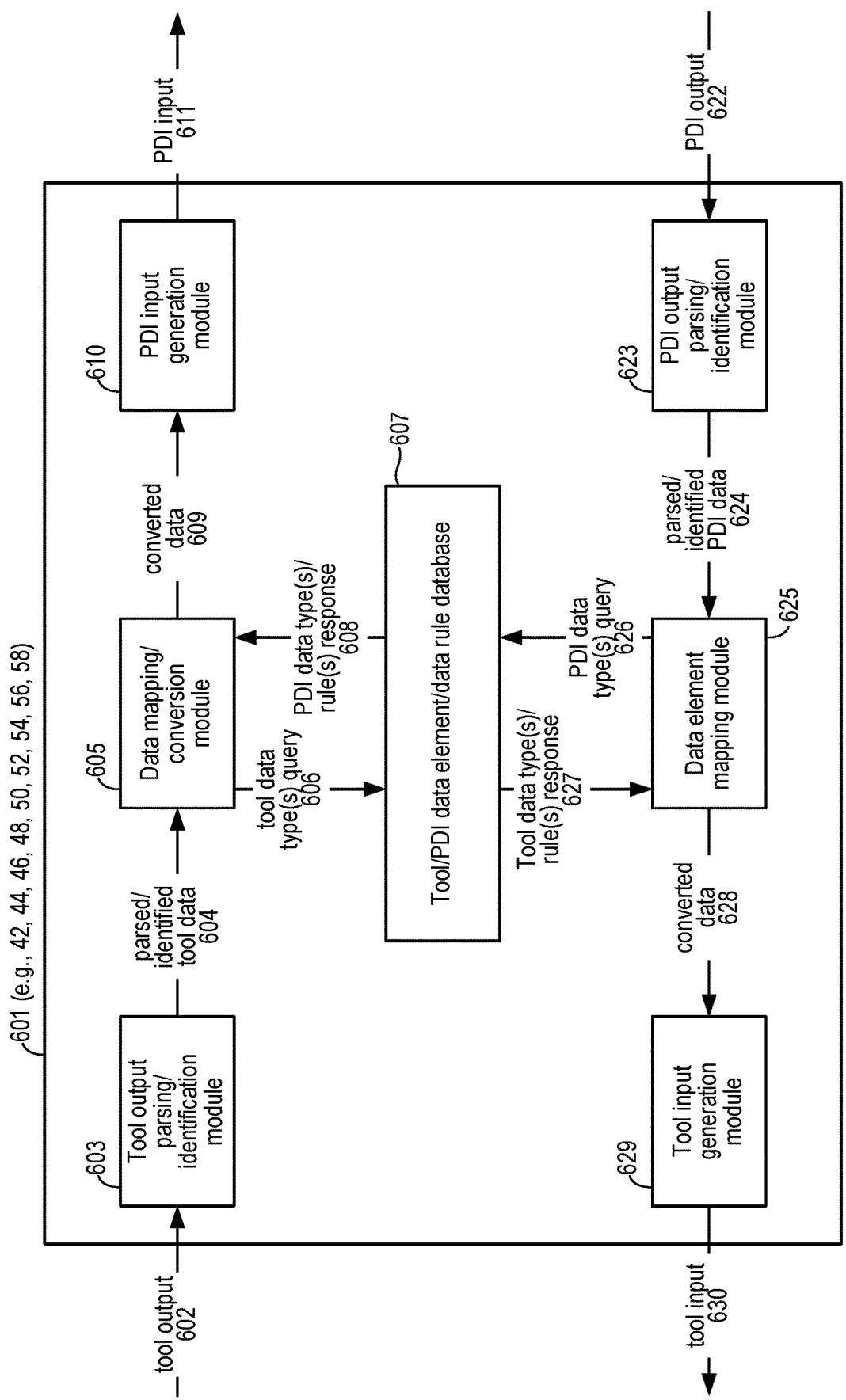
FIG. 8 is a diagram showing an example connector.

FIG. 8 is a diagram showing an example connector 601. Any of the connectors described herein (e.g., the requirements definition tool connector 42, the system architecture tool connector 44, the virtual implementation tool connector 46, the simulation/test tool connector 48, the acceptance testing tool connector 50, the technical documentation tool connector 52, the manufacturing tool connector 54, the sustainment/maintenance tool connector 56, the PLM connector 58) may comprise some or all of the features of the connector 601 and/or may be configured to operate in a manner such as (or similar to) that described below for the connector 601. The connector 601 may comprise a plurality of modules that comprise one or more software routines that are configured to carry out operations such as those described below.

The connector 601 may receive a tool output 602 from the software tool that corresponds to the tool 601 (e.g., the requirements definition tool 12 corresponding to the requirements definition tool connector 42, the system architecture tool 14 corresponding to the system architecture tool connector 44, the virtual implementation tool 16 corresponding to the virtual implementation tool connector 46, the simulation/test tool 18 corresponding to the simulation/test tool connector 48, the acceptance testing tool 20 corresponding to the acceptance testing tool connector 50, the technical documentation tool 22 corresponding to the technical documentation tool connector 52, the manufacturing tool 24 corresponding to the manufacturing tool connector 54, the sustainment/maintenance tool 24 corresponding to the sustainment/maintenance tool connector 56). The tool output 602 may, for example, comprise the requirements data output in step 65 of FIG. 4A by the requirements definition tool 12, the system architecture data output in step 85 of FIG. 4B by the system architecture tool 14, the virtual model data output in step 105 of FIG. 4C by the virtual implementation tool 16, the simulation/test data output in step 125 of FIG. 4D by the simulation test tool 18, acceptance testing data output by the acceptance testing tool 20, technical documentation data output by the technical documentation tool 50, manufacturing data output by the manufacturing tool 24, or sustainment/maintenance data output by the sustainment/maintenance tool 26. The tool output 602 may initially be processed by a tool output parsing and identification module 603 of the connector 601. The module 603 may be configured to parse the tool output 602 and identify tool data elements in the tool output 602, tool data types associated with those tool data elements, and values of those tool data elements. Tool data elements and tool data element types may, for example, be identified based on tags, variable names, formatting conventions, and/or other known characteristics of output data from the corresponding tool. A tool data element may be atomic and comprise a single data value, or may be an array or other data structure that holds multiple values. The module 603 may output a parsed/identified tool data set 604 that indicates tool data elements, tool data element types, and tool data element values from the tool output 602.

The parsed/identified tool data 604 may be processed by a data mapping/conversion module 605. For each of the tool data types indicated in the tool data 604, the module 605 may send a tool data type(s) query 606 to a tool/PDI data elements/data rules engine 607. The query 606 may indicate each of the tool data types indicated by the tool data 604. The engine 607 may comprise data type mappings that indicate, for some or all of the data types outputtable by the tool that created the tool output 602, one or more corresponding data types of the PDI software 10 (PDI data types). The engine 607 may further comprise rules that control, for tool data types and/or for corresponding PDI data types, converting a tool data type to a PDI data type, and vice versa. Examples of rules may comprise rules that convert a format of data values (e.g., from a percentage to a decimal, from metric to imperial, etc.), rules that map multiple tool data types to a single PDI data type (and vice versa), rules that account for an absence of a corresponding PDI data type for a tool data type (or vice versa) (e.g., rules to insert NU LLs and/or placeholders to avoid breaking routines of the PDI software 10 or of the tool), rules that dictate directionality of a synchronization process, rules that abstract data to be sent to the PDI software 10, and/or other types of rules. Although shown as part of the connector 601 for convenience, the engine 607 may be separate from the connector 601 and accessed by the connector 601 via calls to that separate tool.

Based on the query 606, the tool 607 may return PDI data type(s) and rule(s) corresponding to the tool data types included in the query 606. Based on the returned PDI data type(s) and rule(s), the module 605 may convert some or all of the data elements from the tool output 602 to corresponding PDI data elements. Those PDI data elements, which may include the values from (or derived based on) corresponding tool data elements, are shown in FIG. 8 as converted data 609. The converted data 609 may be processed by a PDI input generation module 610 to generate, based on one or more APIs of the PDI software 10, a PDI input 611. The PDI input 611 may, for example, comprise the PDI software input data corresponding to requirements data shown in step 68 of FIG. 4A, the PDI software input data corresponding to system architecture data shown in step 88 of FIG. 4B, the PDI software input data corresponding to virtual modeling data shown in step 108 of FIG. 4C, the PDI software input data corresponding to simulation/test data shown in step 128 of FIG. 4D, PDI software input data corresponding to acceptance testing data, PDI software input data corresponding to technical documentation data, PDI software input data corresponding to manufacturing data, or PDI software input data corresponding to sustainment/maintenance data.

The connector 601 may also be configured to receive an output from the PDI software 10 and generate an input to the software tool corresponding to the connector 601. For example, a user may request, via a software tool, data from the database portion 51*i* corresponding to the PDI software 10. An output of the PDI software 10, shown in FIG. 8 as PDI output 622, may initially be processed by a PDI output parsing/identification module 623. The module 623 may be similar to the module 603, but may instead be configured to parse the PDI output 622 and identify PDI data elements in the PDI output 622, PDI data types associated with those PDI data elements, and values of those PDI data elements. The module 623 may output a parsed/identified PDI data set 624 that indicates PDI data elements, PDI data element types, and PDI data element values from the PDI output 622. The parsed/identified PDI data 624 may be processed by a data mapping/conversion module 625 that sends a query 626, indicating PDI data types from the PDI data 624, to the engine 607. The engine 607 may send the module 625 a response 627 that indicates the tool data type(s) and rule(s) corresponding to the PDI data type(s) of the query 626. Based on the tool data type(s) and rule(s) from the response 627, the module 625 may convert some or all of the data elements from the PDI output 622 to corresponding tool data elements. Those tool data elements, which may include the values from (or derived based on) corresponding PDI data elements, are shown in FIG. 8 as converted data 628. The converted data 628 may be processed by a tool input generation module 629 to generate, based on one or more APIs of the tool corresponding to the connector 601, a tool input 630.

The connector 601 may be configured to process tool data in the form of separate files. For example, the connector 601 may be configured to receive the tool output data 602 in the form of separate files and to provide the tool input data 630 in the form of separate files. Such a connector configuration may be used in connection with tools (e.g., certain CAD tools and/or manufacturing tools) that create discrete files. Also or alternatively, the connector 601 may be configured to process tool data of tools that create data structures, which may not be in the form of separate files, used to update a database associated with the tool. The engine 607 may be configured to track changes in a database associated with a tool and to move data to the PDI software 10 and/or PDI database 51*i* in real time (e.g., as changes are made by a user of the tool) or according to a preset schedule. For example, the tool output data 602 may comprise data retrieved by the connector 601 from a database associated with the tool corresponding to the connector 601 (e.g., retrieved by the connector 42 from the database 51*a* associated with the tool 12, retrieved by the connector 44 from the database 51*b* associated with the tool 14, retrieved by the connector 46 from the database 51*c* associated with the tool 16, retrieved by the connector 48 from the database 51*d* associated with the tool 18, retrieved by the connector 50 from the database 51*e* associated with the tool 20, retrieved by the connector 52 from the database 51*f* associated with the tool 22, retrieved by the connector 54 from the database 51*g* associated with the tool 24, retrieved by the connector 56 from the database 51*h* associated with the tool 26). Similarly, the tool input data 630 may also or alternatively comprise data that the connector writes to the database associated with the tool corresponding to the connector 601.

The connector 601 may be configured to copy tool data from the tool output 602 and store that tool data in the database 51*i*. A link to that copied tool data may be created in project data of the PDI software 10 that is also stored in the database 51*i*. For example, the PDI input 611 may comprise an update to project data based on the tool output 602, which update may comprise a link to a copy of the tool output data 602 that is stored in the database 51*i*. Also or alternatively, such a link could be a link to data, stored in a database associated with the tool, that is the same as or based on the tool output data 602.

As indicated above, the requirements definition tool connector 42 may comprise some or all of the features of the connector 601 and/or may be configured to operate in a manner such as that described above for the connector 601. The engine 607 may be configured to enforce business rules that define a single owner of the requirements data so that, for example, requirements data may be synchronized but a source (e.g., one or more defined users) maintains control of the requirements data and the ability to prevent any unwanted changes or deletions. Requirements data from the requirements definition tool 12 may be pushed (e.g., in an output from the requirements definition tool 12) in whole, or in part, as is appropriate. Granularity of division in requirements data transfers may be controlled at the level of an entire project, at the level of requirements collections, individual requirements, individual attributes of requirements, or any grouping of requirements. Further, selections of data to push (in any grouping) may be configured as is appropriate. Controlled data pushes may be executed along timelines included, but not limited to one/few-time transfer, on-demand transfer, or regularly scheduled transfer.

The requirements definition tool connector 42 may be configured to match disparate data and data types across projects. For example, a risk rating of 1, 2, 3, 4, 5 in the requirements tool 12 (or in the PDI software 10) may be aligned with a risk rating of 20, 40, 60, 80, 100% in the PDI software 10 (or in the requirements tool 12). Data changes in the requirements tool 12 may lead to aligned data changes in the PDI software 10 (and vice versa). The requirements definition tool connector 42 may also be configured to implement multiple requirements model connections, including but not limited to one-to-one data transfers, one-to-many data transfers, many-to-one data transfers, and/or many-to-many data transfers. A one-to-one data transfer may comprise a transfer, from the requirements definition tool 12, of data for one project to the PDI software 10 for adding to data for another project, or vice versa. A one-to-many data transfer may comprise a transfer, from the requirements definition tool 12, of data for one project to the PDI software 10 for adding to data for multiple other projects, or vice versa. A many-to-one data transfer may comprise a transfer, from the requirements definition tool 12, of data for multiple projects to the PDI software 10 for adding to data for another project, or vice versa. A many-to-many data transfer may comprise a transfer, from the requirements definition tool 12, of data for multiple projects to the PDI software 10 for adding to data for multiple other projects, or vice versa.

Flexibility to implement multiple types of requirements model connections facilitates multiple use cases. Examples of such use cases may comprise requirements federation, contractor-subcontractor requirements data control, requirements data control for Request for Information (RFI), requirements data control for Request for Proposal (RFP) management, requirements data control for proposal management, requirements data control for communication between multiple contractors and/or subcontractors, issuer-issuee data control, rapid creation and population of projects, adherence to schema, alignment of disparate requirements types, data transfer across multiple tools, data transfer across multiple instances of the same tool, and/or data transfer across projects within a single instance of a tool. A contractor, for example, may share data, via the requirements definition tool connector 42, with multiple subcontractors. The contractor may provide separate requirements data to each of the subcontractors (e.g., based on the separate requirements of subcontracts). The contractor may receive (and thus have access to) all data from all subcontractors, but each of the subcontractor may be limited to accessing its requirements and any data that it provided to the contractor.

As indicated above, the system architecture tool connector 44 may comprise some or all of the features of the connector 601 and/or may be configured to operate in a manner such as that described above for the connector 601. Tool outputs from the system architecture tool 14 may comprise data elements conforming to a first interpretation of the System Modeling Language (SysML). SysML may be used to define a system architecture for an engineering project. The system architecture tool connector 44 may map and convert system architecture tool data elements to system architecture data elements, used by the PDI software 10, that are based on a second interpretation of SysML (and vice versa).

As indicated above, the simulation/test tool connector 48 may comprise some or all of the features of the connector 601 and/or may be configured to operate in a manner such as that described above for the connector 601. The simulation/test tool connector 48 may be configured to implement a data model to support validating requirements and product. For example, that data model may be configured to determine if one or more aspects of a system design satisfy requirements of requirements definition data for the system. The simulation/test tool connector 48 may be modular and configured to support a wide variety of analysis tools. The simulation/test tool connector 48 may be configured to abstract data from other domains (e.g., requirement properties abstracted from requirements definition data, CAD geometry abstracted from virtual implementation data, system model architecture abstracted from system architecture data, etc.). The simulation/test tool connector 48 may be configured to package and/or transfer data to designated analytical execution engines, to perform consistency validation to determine if changes have occurred during an analysis cycle time, to abstract simulation and/or test results, and/or to validate simulation and/or test results based on requirements properties and/or other criteria.

As indicated above, the manufacturing tool connector 54 may comprise some or all of the features of the connector 601 and/or may be configured to operate in a manner such as that described above for the connector 601. The manufacturing tool 24 may comprise an Enterprise Resource Planning (ERP) tool, and the manufacturing tool connector may be configured to map and/or synchronize part data, Manufacturing Bill of Materials (MBOM) data, and process plans from the PDI database 51i (and/or from databases associated with one or more tools) into the ERP tool. Such synchronization may facilitate reservation of part numbers by the ERP tool, data mapping of properties in the PDI database 51i (and/or from databases associated with one or more tools) to properties in the ERP tool, automatic synchronization of Engineering Bill of Materials (EBOM) and MBOM based on approvals during change management processes (e.g., changes performed using the sustainment/maintenance tool 26), and/or federation of ERP data (e.g., which may be queried at load time) to allow access to pertinent information (e.g., cost, inventory).

The PLM connector 58 may comprise some or all of the features of the connector 601 and/or may be configured to operate in a manner such as that described above for the connector 601. Instead of providing an interface between the PDI software 10 and a tool, however, the PLM connector may provide an interface the PDI software 10 and a separate (e.g., legacy) PLM system. Such a PLM connector may be configured to map and/or synchronize data (e.g., product data) between the PDI software 10 and the separate PLM system, to integrate business rules to enforce data ownership, and/or to map data and/or data flows. Synchronization between the PDI software 10 and the separate PLM system may be complete or partial. For example, part data may be maintained by the PDI software 10, and CAD models and CAD metadata from a legacy PLM system may be synched to the part data. Other types of data (e.g., requirements data, system architecture data, simulation/test data, acceptance testing data, technical documentation data, manufacturing data, and/or sustainment/maintenance data) from a legacy PLM system may similarly be synchronized with data maintained by the PLI software 10. The PLM connector 58 may be configured so that a change associated with a system design in the PLI software 10 that impacts data in a separate PLM system spawns a child change in that separate PLM system. The PLM connector 58 and/or the PDI software 10 may be further configured so that the system design change that spawned the child change is not allowed to close until the child change has closed.

Figure 9:
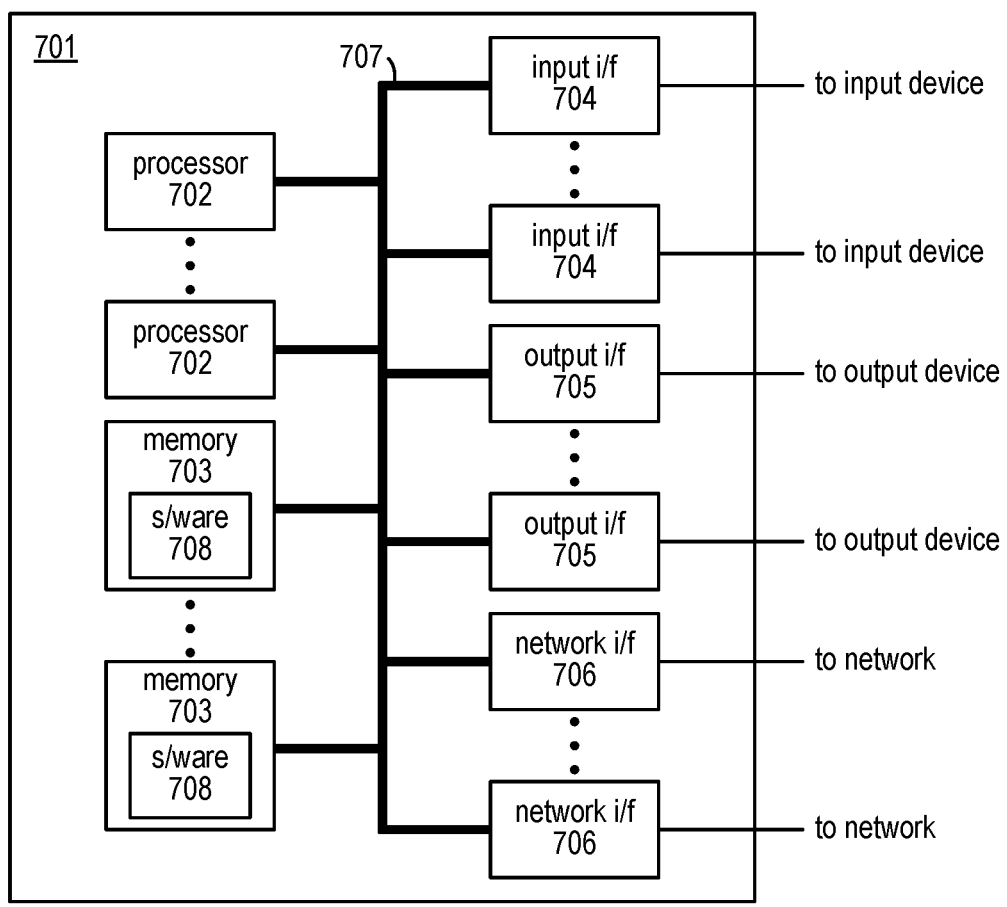
FIG. 9 is a block diagram of an example computing device.

FIG. 9 is a block diagram of an example computing device 701, one or more of which may be used to implement the computing system 30, any of the computing devices 35 through 38, and/or other computing device(s) and to perform operations such as those described herein. Computing device 701 may comprise one or more processors 702, one or more memories 703, one or more input interface controllers 704, one or more output interface controllers 705, and one or more network interfaces 706, all of which may communicate over one or more busses 707. Processor(s) 702 may include any of various types of computational devices such as, without limitation, programmable microprocessors.

Processor(s) 702 may execute instructions that cause computing device 701 to perform one or more operations such as are described herein. Memory(ies) 703 may include any of various types of non-transitory machine-readable storage media such as, without limitation, random access memory (RAM), read-only memory (ROM), FLASH memory, magnetic tape or discs, optical discs, etc. Memory(ies) 703 may be volatile or non-volatile. Input interface controller(s) 704 may include hardware and/or software that allow user input devices (e.g., a keyboard, a mouse, a touch screen) to communicate data to processor(s) 702. Output interface controller(s) 705 may include hardware and/or software that allow user output devices (e.g., display screens, printers) to output user-understandable information based on data from processor(s) 702. Network interface(s) 706 may include hardware and/or software that allow processor(s) 702 to communicate with processors of other computers via one or more types of wired or wireless networks. Examples of network interfaces include, without limitation, Ethernet adaptors and Wi-Fi adaptors (e.g., operating in accordance with one or more IEEE 802.11 WLAN standards).

Memory(ies) 703 may store software 708 that provides instructions to processor(s) 702 that, when executed by processor(s) 702, cause computer 701 to perform some or all operations such as are described herein. Software 708 may comprise machine-executable instructions and/or other data, and may include both application software and operating system software. Executable instructions that cause computer 701 to perform operations such as are described herein may also or alternatively be stored in other forms, e.g., as firmware or as hardware logic in an integrated circuit.

The foregoing has been presented for purposes of example. The foregoing is not intended to be exhaustive or to limit features to the precise form disclosed. The examples discussed herein were chosen and described in order to explain principles and the nature of various examples and their practical application to enable one skilled in the art to use these and other implementations with various modifications as are suited to the particular use contemplated. The scope of this disclosure encompasses, but is not limited to, any and all combinations, sub-combinations, and permutations of structure, operations, and/or other features described herein and in the accompanying drawing figures.

The invention claimed is:

1. A method comprising:
   generating, using a first digital engineering (DE) software tool executing on a computing system, and based on one or more first inputs received via a network from a first computing device, first design data for a project;
   generating, by the computing system and using a first connector corresponding to the first DE software tool, first project data integration (PDI) input data corresponding to at least a portion of the first design data;
   generating, using PDI software executing on the computing system and based on the first PDI input data, first project data for the project, wherein the first project data corresponds to a portion of the first design data;
   generating, using a second DE software tool executing on the computing system and based on one or more second inputs received via the network from a second computing device, second design data for the project, wherein the second design data comprises at least one of:
      modelling data for physical components for the project; or
      simulation data for the project;
   generating, by the computing system and using a second connector corresponding to the second DE software tool, second PDI input data corresponding to at least a portion of the second design data;
   generating, by the PDI software and based on the second PDI input data, second project data for the project, wherein the second project data corresponds to a portion of the second design data; and
   outputting, by the PDI software, via the network, an indication of a relation between a design feature associated with the second design data and a design feature associated with the first design data.

2. The method of claim 1, further comprising:
   receiving, by the computing system via the network and via a first web interface of the first computing device, the one or more first inputs; and
   receiving, by the computing system via the network and via a second web interface of the second computing device, the one or more second inputs.

3. The method of claim 1, wherein the first design data comprises requirements data for the project.

4. The method of claim 1, wherein the first DE software tool is not an extension of, and is not native to, the PDI software, and wherein the second DE software tool is not an extension of, and is not native to, the PDI software.

5. The method of claim 1, further comprising outputting, by the computing system and via the first and second computing devices, an interface configured to:
   receive input of a selection of the first DE software tool, the second DE software tool, or the PDI software; and
   provide access, based on the selection, to the first DE software tool, the second DE software tool, or the PDI software.

6. The method of claim 1, further comprising:
   tracking, by the computing system, usage of the first DE software tool by the first computing device and usage of the second DE software tool by the second computing device.

7. The method of claim 1, further comprising:
   receiving, via the PDI software, one or more inputs linking at least a portion of the first design data and at least a portion of the second design data.

8. The method of claim 1, further comprising:
   generating, using the first connector and based on output data from the PDI software, input data to the first DE software tool.

9. A computing system comprising:
   one or more processors; and
   memory storing instructions that, when executed by the one or more processors, cause the computing system to:
      generate, using a first digital engineering (DE) software tool and based on one or more first inputs received via a network from a first computing device, first design data for a project;
      generate, using a first connector corresponding to the first DE software tool, first project data integration (PDI) input data corresponding to at least a portion of the first design data;
      generate, using PDI software and based on the first PDI input data, first project data for the project, wherein the first project data corresponds to a portion of the first design data;
      generate, using a second DE software tool and based on one or more second inputs received via the network from a second computing device, second design data for the project, wherein the second design data comprises at least one of:

modelling data for physical components for the project; or simulation data for the project;

generate, using a second connector corresponding to the second DE software tool, second PDI input data corresponding to at least a portion of the second design data;

generate, using the PDI software and based on the second PDI input data, second project data for the project, wherein the second project data corresponds to a portion of the second design data; and cause, using the PDI software, output of an indication of a relation between a design feature associated with the second design data and a design feature associated with the first design data.

10. The computing system of claim 9, wherein the instructions, when executed by the one or more processors, cause the computing system to:

receive, via the network and via a first web interface of the first computing device, the one or more first inputs; and receive, via the network and via a second web interface of the second computing device, the one or more second inputs.

11. The computing system of claim 9, wherein the first design data comprises requirements data for the project.

12. The computing system of claim 9, wherein the first DE software tool is not an extension of, and is not native to, the PDI software, and wherein the second DE software tool is not an extension of, and is not native to, the PDI software.

13. The computing system of claim 9, wherein the instructions, when executed by the one or more processors, cause the computing system to output, via the first and second computing devices, an interface configured to:

receive input of a selection of the first DE software tool, the second DE software tool, or the PDI software; and provide access, based on the selection, to the first DE software tool, the second DE software tool, or the PDI software.

14. The computing system of claim 9, wherein the instructions, when executed by the one or more processors, cause the computing system to:

generate, using the first connector and based on output data from the PDI software, input data to the first DE software tool.

15. One or more non-transitory machine-readable media storing instructions that, when executed by one or more processors of a computing system, cause the computing system to:

generate, using a first digital engineering (DE) software tool and based on one or more first inputs received via a network from a first computing device, first design data for a project;

generate, using a first connector corresponding to the first DE software tool, first project data integration (PDI) input data corresponding to at least a portion of the first design data;

generate, using PDI software and based on the first PDI input data, first project data for the project, wherein the first project data corresponds to a portion of the first design data;

generate, using a second DE software tool and based on one or more second inputs received via the network from a second computing device, second design data for the project, wherein the second design data comprises at least one of:

modelling data for physical components for the project; or simulation data for the project;

generate, using a second connector corresponding to the second DE software tool, second PDI input data corresponding to at least a portion of the second design data;

generate, using the PDI software and based on the second PDI input data, second project data for the project, wherein the second project data corresponds to a portion of the second design data; and cause, using the PDI software, output of an indication of a relation between a design feature associated with the second design data and a design feature associated with the first design data.

16. The one or more non-transitory machine-readable media of claim 15, wherein the instructions, when executed by the one or more processors of the computing system, cause the computing system to:

receive, via the network and via a first web interface of the first computing device, the one or more first inputs; and receive, via the network and via a second web interface of the second computing device, the one or more second inputs.

17. The one or more non-transitory machine-readable media of claim 15, wherein the first design data comprises requirements data for the project.

18. The one or more non-transitory machine-readable media of claim 15, wherein the first DE software tool is not an extension of, and is not native to, the PDI software, and wherein the second DE software tool is not an extension of, and is not native to, the PDI software.

19. The one or more non-transitory machine-readable media of claim 15, wherein the instructions, when executed by the one or more processors of the computing system, cause the computing system to:

receive input of a selection of the first DE software tool, the second DE software tool, or the PDI software; and provide access, based on the selection, to the first DE software tool, the second DE software tool, or the PDI software.

20. The one or more non-transitory machine-readable media of claim 15, wherein the instructions, when executed by the one or more processors of the computing system, cause the computing system to:

generate, using the first connector and based on output data from the PDI software, input data to the first DE software tool.

* * * * *